US010539713B2

(12) United States Patent
Haupt et al.

(10) Patent No.: US 10,539,713 B2
(45) **Date of Patent: *Jan. 21, 2020**

(54) LOCATION MONITORING VIA A GATEWAY

(71) Applicant: La Crosse Technology Ltd., La Crosse, WI (US)

(72) Inventors: Rolf Haupt, Chaiwan (HK); Allan McCormick, La Crescent, MN (US)

(73) Assignee: La Crosse Technology Ltd., La Crosse, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/145,527

(22) Filed: Sep. 28, 2018

(65) Prior Publication Data

US 2019/0041547 A1 Feb. 7, 2019

Related U.S. Application Data

(63) Continuation of application No. 14/836,108, filed on Aug. 26, 2015, now Pat. No. 10,120,105, which is a (Continued)

(51) Int. Cl.

*G01W 1/14* (2006.01)
*G08B 25/08* (2006.01)

(Continued)

(52) U.S. Cl.

CPC .............. *G01W 1/14* (2013.01); *G01D 21/00* (2013.01); *G01W 1/02* (2013.01); *G01W 1/10* (2013.01);

(Continued)

(58) Field of Classification Search

CPC ........... G01W 1/14; G01W 1/00; G01W 1/10; G01W 1/02; G01D 21/00; G08B 25/14; G08B 25/08; G08B 25/10

(Continued)

(56) References Cited

U.S. PATENT DOCUMENTS 6,076,044 A 6/2000 Brown
6,643,355 B1 11/2003 Tsumpes (Continued)

OTHER PUBLICATIONS

International PCT/US2008/080953 Notification of Transmittal of the International Search Report and the Written Opinion of the Searching Authority, or the Declaration dated Dec. 29, 2008.

(Continued)

*Primary Examiner* — John A Tweel, Jr.

(74) *Attorney, Agent, or Firm* — Banner & Witcoff, Ltd.

(57) ABSTRACT

A remote location monitoring system, for example, a home monitoring or weather monitoring system may include one or more sensors and/or receivers at a first location such as a residence or business to be monitored. The sensors and receivers may communicate with a remote central server via a gateway device and the detection data received from the sensors and receivers may be displayed via display circuitry coupled to a processor of the gateway device. The sensors, receivers, and gateway device may be controlled by users locally or remotely via the server. Users may register to receive remote notifications of weather events and other home monitoring events. Users may also access remotely sensors and receivers to configure alerts, notifications, and automatic responses for the devices and integrated appliances at the first location.

20 Claims, 23 Drawing Sheets

Related U.S. Application Data continuation-in-part of application No. 14/509,631, filed on Oct. 8, 2014, now Pat. No. 9,528,861, which is a continuation-in-part of application No. 14/023, 817, filed on Sep. 11, 2013, now Pat. No. 9,140,583, which is a continuation of application No. 13/439, 152, filed on Apr. 4, 2012, now Pat. No. 8,558,687, which is a continuation of application No. 12/349, 231, filed on Jan. 6, 2009, now Pat. No. 8,154,398, which is a continuation-in-part of application No. 12/057,761, filed on Mar. 28, 2008, now Pat. No. 8,339,901.

(60) Provisional application No. 61/019,299, filed on Jan. 7, 2008, provisional application No. 60/981,862, filed on Oct. 23, 2007, provisional application No. 60/982,096, filed on Oct. 23, 2007, provisional application No. 60/982,137, filed on Oct. 23, 2007.

(51) Int. Cl.

| | |
|---|---|
| ***G01W 1/02*** | (2006.01) |
| ***G01W 1/10*** | (2006.01) |
| ***G08B 25/10*** | (2006.01) |
| ***G01D 21/00*** | (2006.01) |
| *G08B 1/08* | (2006.01) |
| *G08B 21/10* | (2006.01) |
| *G08B 25/14* | (2006.01) |

(52) U.S. Cl.
CPC ............ *G08B 25/08* (2013.01); *G08B 25/10* (2013.01); *G01W 2203/00* (2013.01); *G08B 1/08* (2013.01); *G08B 21/10* (2013.01); *G08B 25/14* (2013.01); *Y02A 90/14* (2018.01)

(58) Field of Classification Search
USPC ........................................................ 340/521
See application file for complete search history.

(56) References Cited

U.S. PATENT DOCUMENTS

| | | | | |
|---|---|---|---|---|
| 6,678,215 | B1 | 1/2004 | Treyz et al. | |
| 6,751,164 | B1 | 6/2004 | Sekiguchi | |
| 6,876,600 | B2 | 4/2005 | Ito et al. | |
| 6,917,297 | B2 | 7/2005 | Andrews et al. | |
| 6,967,900 | B2 | 11/2005 | Chapman | |
| 6,970,924 | B1 | 11/2005 | Chu et al. | |
| 7,113,090 | B1 | 9/2006 | Saylor et al. | |
| 7,277,935 | B2 | 10/2007 | Sato | |
| 7,376,509 | B2 | 5/2008 | Endo et al. | |
| 7,526,792 | B2 | 4/2009 | Ross | |
| 7,633,378 | B2 | 12/2009 | Rodgers et al. | |
| 8,154,398 | B2 | 4/2012 | Rolf et al. | |
| 8,209,400 | B2 | 6/2012 | Baum et al. | |
| 8,301,142 | B2 | 10/2012 | Okuda | |
| 8,339,901 | B2 | 12/2012 | Haupt et al. | |
| 8,558,687 | B2 | 10/2013 | Haupt et al. | |
| 9,140,583 | B2 | 9/2015 | Haupt et al. | |
| 9,528,861 | B1 | 12/2016 | Haupt et al. | |
| 9,746,990 | B2 | 8/2017 | Anderson et al. | |
| 10,120,105 | B2 * | 11/2018 | Haupt | G01W 1/14 |
| 10,145,987 | B2 * | 12/2018 | Haupt | G08B 25/08 |
| 10,146,410 | B2 * | 12/2018 | Haupt | G08B 25/08 |
| 10,234,597 | B2 * | 3/2019 | Haupt | G01W 1/02 |
| 10,237,358 | B2 * | 3/2019 | Haupt | G01W 1/02 |
| 2002/0012290 | A1 | 1/2002 | Shinagawa | |
| 2003/0189876 | A1 | 10/2003 | Chan | |
| 2004/0212497 | A1 | 10/2004 | Stilp | |
| 2004/0249568 | A1 | 12/2004 | Endo et al. | |
| 2005/0108213 | A1 | 5/2005 | Riise et al. | |
| 2005/0174889 | A1 | 8/2005 | Marcantonio et al. | |
| 2005/0216580 | A1 | 9/2005 | Raji et al. | |
| 2005/0232086 | A1 | 10/2005 | Jiddou et al. | |
| 2006/0092010 | A1 | 5/2006 | Simon et al. | |
| 2006/0095210 | A1 | 5/2006 | Chan | |
| 2009/0243852 | A1 | 10/2009 | Haupt et al. | |
| 2015/0364027 | A1 | 12/2015 | Haupt et al. | |
| 2016/0210425 | A1 | 7/2016 | Sidoti et al. | |

OTHER PUBLICATIONS

PCT/US2008/080953, International Preliminary Report on Patentability, dated May 6, 2010.
Visonic, DL-125C Programmable 2-Channel Speech Dialer, Installation Instructions, pp. 1-6, dated 1999.
Onset HO80 Data Loggers, Onset Announces Data Logging for Wine Cellar Monitoring, Exhibit 008, www.onsetcom.com/corporate/press, 1 p., dated May 24, 2013.
XR30CX, Digita controller with off cycle defrost and AUX relay, Installing and Operating Instructions, pp. 1-4, dated Mar. 5, 2007.
Sensaphone, Desktop Monitoring System, Model 400, User's Manual, Version 1.1, pp. 1-135, dated Jun. 2006.
Wine Cellar Technology, Hinsdale Cellars, A Hinsdale Cellars Exclusive: CellarSensor Makes Sense for Collectors, www.hinsdalecellars.com, pp. 1-2, as retrieved May 24, 2013.
Oct. 10, 2017—Request for Ex Parte Reexamiation Under 37 C.F.R. 1.510—U.S. Pat. No. 8,558,687.

* cited by examiner

LaCross Technology, Inc.
*Powering Targeted Weather Information*

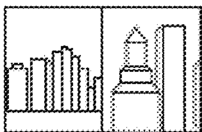

YourOwnWeather.com

Device Diagnostics | Web Help With Devices 100.2.2.100 – Refrigerator Configuration and Status

Device Status and Detailed Information

The following devices are installed in your home:

| Mac Address # | Device Identification and Location |
| --- | --- |
| 100.2.2.100 | Refrigerator: Kitchen |
| 100.2.2.101 | Cell Phone/PDA: Sprint Mobile Network G3 enabled device |
| 100.2.2.102 | Alarm Clock: Bedroom |
| 100.2.2.103 | Car Navigation Device: Mobile |
| 100.2.2.104 | Television |
| 100.2.2.105 | Wall Mounted Weather Display/Clock: Living Room |
| 100.2.2.106 | Watch: Mobile |
| 100.2.2.107 | Telephone |
| 100.2.2.108 | Answering Machine |
| 100.2.2.109 | Furnace |
| 100.2.2.110 | Table Mounted Information Display |
| 100.2.2.111 | Projection Display |
| 100.2.2.112 | Dock Mounted Camera |
| 100.2.2.113 | Home Security System |
| 100.2.2.114 | Outdoor Weather Sensors |

General Information | Camera Display | Diagnostics

| | | |
| --- | --- | --- |
| Display Local Measured Outside Temperature: | Enabled | |
| Tornado Alerts | Enabled | |
| Display Tides | Disabled | |
| Display Indoor Temperature | Enabled | |
| Display Current Furnace Settings | Enabled | |
| Allow Remote Monitoring of Camera | Enabled | |
| E-mail Alerts: | Yes: Allan.McCormick@LaCross.com | |
| Allow Remote Monitoring of Sound | Y | |
| Alert on Internal Temperature Below 50 Degrees | Y | Send Alerts To: |
| Sensors Operational | Y | Click to See Active Sensors |
| Seven Day Display | Y | Click to Select Source of Weather |
| Set Alarm | N | Click to See Alarm Settings |
| Streaming MPEG From Computer | Y | Play I-Tunes Music File "Alarm" |
| Display Outlook Calendar | Y | Click to Link to Outlook |

FIG. 11

LOCATION MONITORING VIA A GATEWAY

RELATED APPLICATION INFORMATION

This application is a continuation of U.S. application Ser. No. 14/836,108 filed on Aug. 26, 2015, entitled "Location Monitoring Via A Gateway," which is a continuation-in-part of U.S. application Ser. No. 14/509,631 filed Oct. 8, 2014, issued as U.S. Pat. No. 9,528,861 on Dec. 27, 2016, entitled "Remote Location Monitoring," which is a continuation-in-part of U.S. application Ser. No. 14/023,817, filed Sep. 11, 2013, issued as U.S. Pat. No. 9,140,583 on Sep. 22, 2015, entitled "Remote Location Monitoring," which is a continuation of U.S. application Ser. No. 13/439,152, filed Apr. 4, 2012, entitled "Remote Location Monitoring," issued on Oct. 15, 2013 as U.S. Pat. No. 8,558,687, which is a continuation of U.S. application Ser. No. 12/349,231, filed Jan. 6, 2009, entitled "Remote Location Monitoring," issued on Apr. 10, 2012, as U.S. Pat. No. 8,154,398, which is a continuation-in-part of U.S. application Ser. No. 12/057,761, entitled "Display Station," filed on Mar. 28, 2008, issued on Dec. 25, 2012, as. U.S. Pat. No. 8,339,901, which claims priority to U.S. Provisional Application 60/982,137, entitled "Method of Transmitting, Receiving and Forwarding Data in a Low Power Network System," to Allan McCormick and Rolf Haupt, filed on Oct. 23, 2007, U.S. Provisional Application 60/982,096, entitled "Method of Transmitting, Receiving and Displaying/Playing Data such as Internet Radio Time, and Music on a Network System," to Allan McCormick and Rolf Haupt, filed on Oct. 23, 2007, U.S. Provisional Application 60/981,862, entitled "Method and Apparatus of Transmitting, Receiving, Displaying and Playing Weather Data," to Allan McCormick and Rolf Haupt, filed on Oct. 23, 2007, and U.S. Provisional Application 61/019,299, entitled "Method and Apparatus of Transmitting, Receiving, Displaying and Playing Weather Data," to Rolf Haupt and Allan McCormick, filed on Jan. 7, 2008. Each of the above applications is incorporated by reference herein in its entirety for all purposes.

FIELD OF THE INVENTION

Aspects of the disclosure relate to remote location monitoring, for example, home monitoring and weather monitoring. More specifically, aspects of the invention relate to receiving and processing communications from detection devices and sensors at remote locations in order to inform users of the conditions and events occurring at the remote locations.

BACKGROUND

A home weather station with an exterior sensor may include external measurement mechanisms for the measuring or recording weather data in the exterior ambient area of a building. By means of a transmission mechanism which is combined with a measurement mechanism, the weather data is transmitted into the building and received by an internal receiving mechanism. The weather data transmission uses a radio signal in an appropriate data format for the receiving mechanism, which is an element of the home weather station located inside the building. The weather station may comprise a display mechanism combined with the receiving mechanism for the optical reproduction and display of the weather data within the building.

For example, a known weather station from the company Reinhardt Systems and Messelectronic GmbH, Bergstr. 33, 86911 Diessen-Obermiihlhausen, Germany, has the product name "MWS 5 W". The unit measures temperature, relative humidity, barometric air pressure, wind speed and wind direction and transfers this data as serial ASCII-data to a connected Laptop or PC or stores the data internally in a data logger memory. The weather station is mounted on a 1" water pipe or on a tripod. With the optional GPS-module, the time axis data in the data logger can be synchronized to the exact time, height, and geographical position. The memory capacity is 12 days if the data is recorded in 10 minutes intervals. Another system, described in DE 198 01 688 A1, includes a radio signal converter that receives a timing signal from a timing signal sender and sends an appropriate signal at another frequency to a timer which is located within a closed building. The frequency is selected such that this signal as opposed to the original timing signal can penetrate the building so that the timer can always be synchronized. Such an arrangement has multiple individual components. However, such a system would not function properly in the many places on the planet where there is no receiving for a timing signal that can be received outside a building. Furthermore, when a timing signal can be received, a device would be required that can be adjusted to individual specific features of the timing signal in a specific momentary location area.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, methods, systems, and devices are provided for remote location monitoring, including detecting and transmitting detection data from one or more detection devices at one or more remote locations to a server via a computer network. The detection data may correspond to detection readings from the various detector devices, for example, temperature sensors, wind sensors, humidity sensors, pressure sensors, rain sensors, motion sensors, alarm sensors, and other weather and home monitoring sensors. After receiving the detection data, the server may identify a detector type associated with the data and retrieve a set of detection parameters for notifying users of the data detected at the remote locations. Users may register to receive notifications (e.g., pages, text messages, emails) upon detection of certain conditions (e.g., weather conditions, alarm conditions), at remote locations. For example, a user may register to receive a notification by email every time the temperature sensor in that user's back yard drops below a specified temperature (e.g., 20° F.). As anther example, a user may request a text message or phone call to the user's work phone or text message to the user's mobile phone when a burglar alarm or smoke detector sounds in the user's home.

According to an additional aspect, the server may be configured to display detection data from multiple different detectors at different remote locations on a single web site interface. For example, all weather updates (e.g., temperature, wind, rain, humidity) may be logged and displayed as overlays on a digital map, presenting users with may different data points to allow for more detailed views and predictions of the coming weather conditions. According to yet another aspect, users may select individual readings or data points on such a map to view for detailed information about the location, review previous readings, and send messages to the registered user(s) associated with the location.

According to another aspect, remote location sensors and detector devices may relate to home monitoring, such as detectors for smoke detectors, fire alarms, burglar alarms, power consumption monitors, motion detectors, standing water monitors, and other home monitoring detection devices. In certain embodiments, an audible analog alarm signal may be detected by an audio detector at a remote location. The analog alarm signal may be converted to a digital signal and compared to one or more predetermined digital alarm pattern signals. Upon determining that the audible signal corresponds to known alarm signal (e.g., a smoke alarm signal), a notification may be transmitted to a user registered to receive notifications for that location.

According to additional aspects, a mobile receiver device may execute a mobile application configured to perform various remote sensor monitoring functions. In some embodiments, a mobile receiver device may receive user input identifying or more sensor devices to monitor, for example, via a camera or barcode scanner of the mobile device. The mobile receiver device may use the captured input data to determine one or more sensor identifiers, and may transmit data requests to a remote location monitoring server for sensor data from the corresponding sensor devices. The server may receive sensor data collected by the sensor devices via gateway devices, and may provide the sensor data to the mobile receiver devices in response to requests from mobile applications.

According to additional aspects, sensor devices may transmit data to multiple gateway devices within their transmission ranges, for example, using one-way broadcast communications of sensor identifiers, transmission sequence numbers, and sensor data readings. Each gateway device may receive sensor data from sensors, and then transmit the sensor data to a remote location monitoring server, and thus the server may receive duplicate sets of sensor data from different gateways. In some cases, the server may identify duplicate sets of sensor data based on the sensor identifier and/or transmission sequence number.

Other features and advantages of the disclosure will be apparent from the additional description provided herein.

BRIEF DESCRIPTION OF THE DRAWINGS

Figure 1:
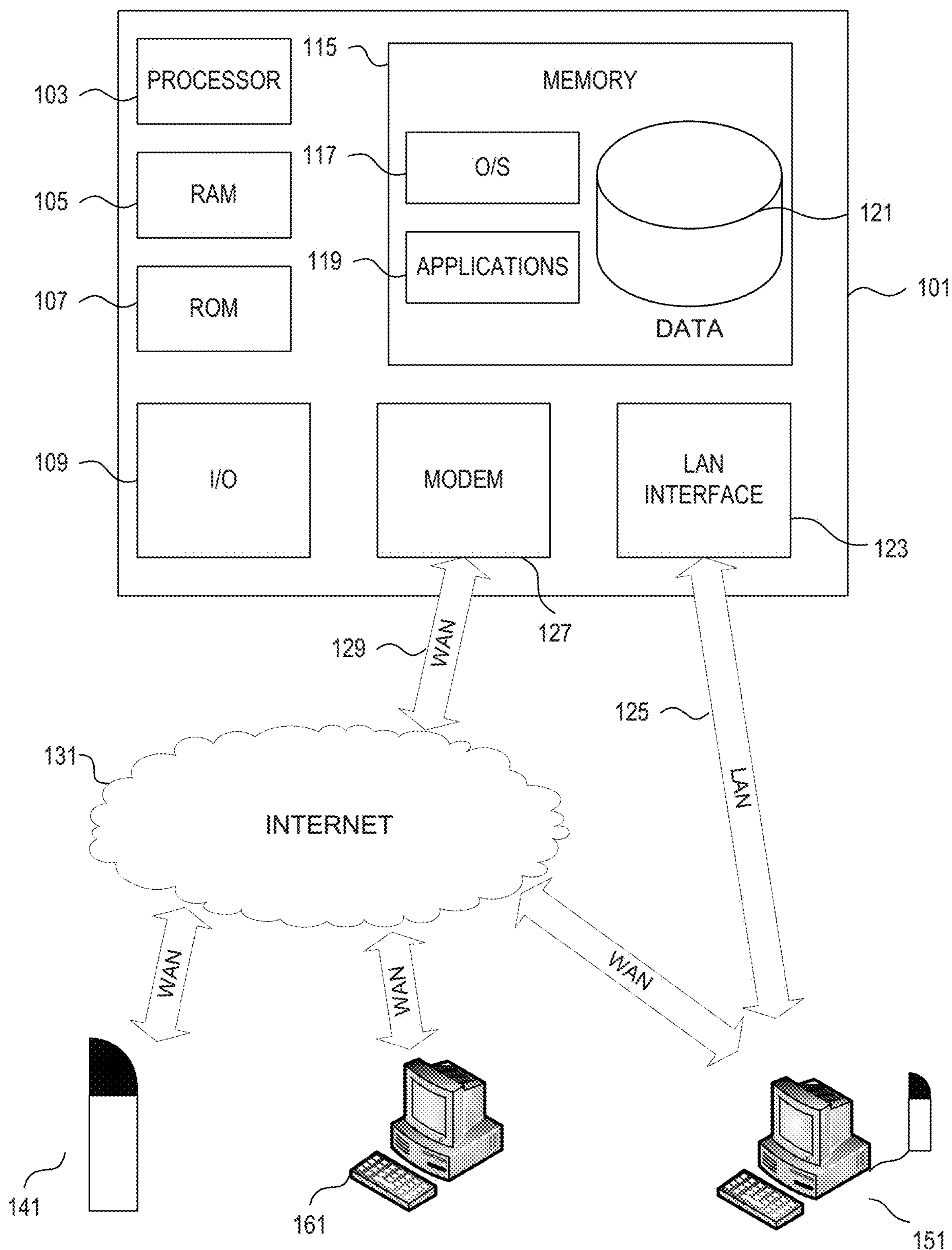
Figure 2:
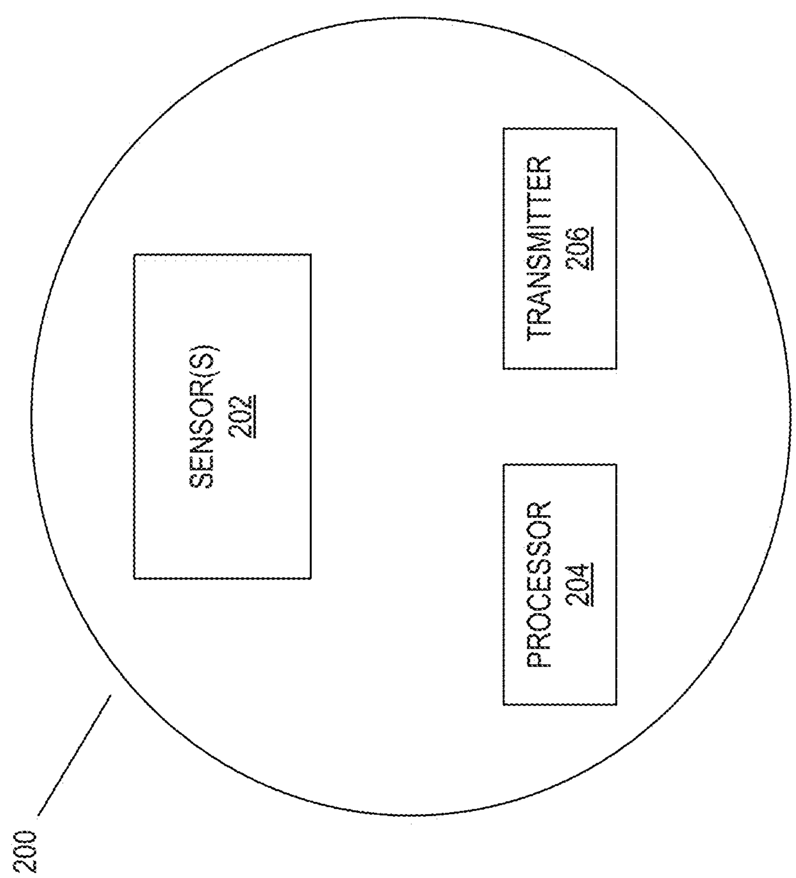
Figure 3A:
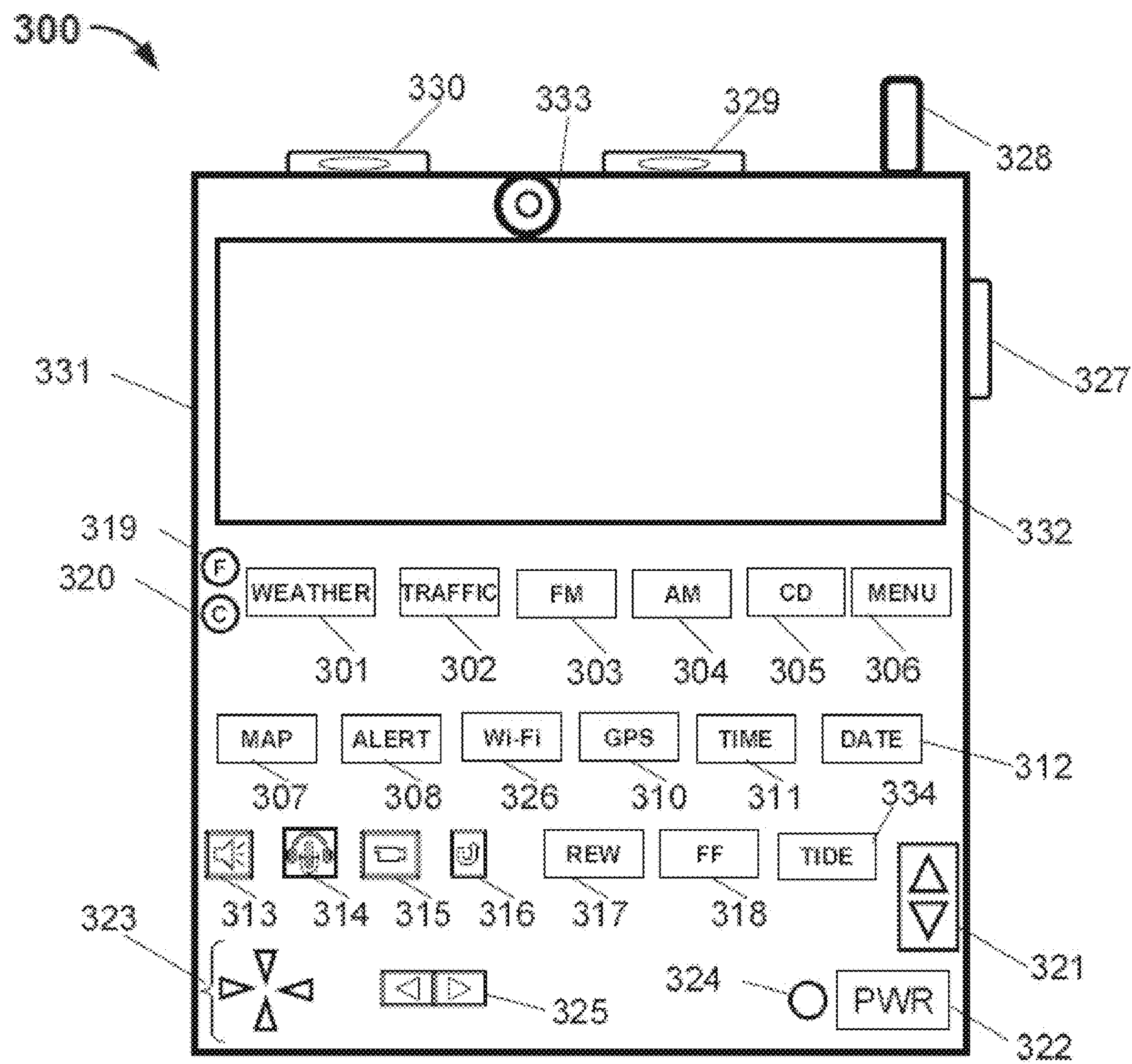
Figure 3B:
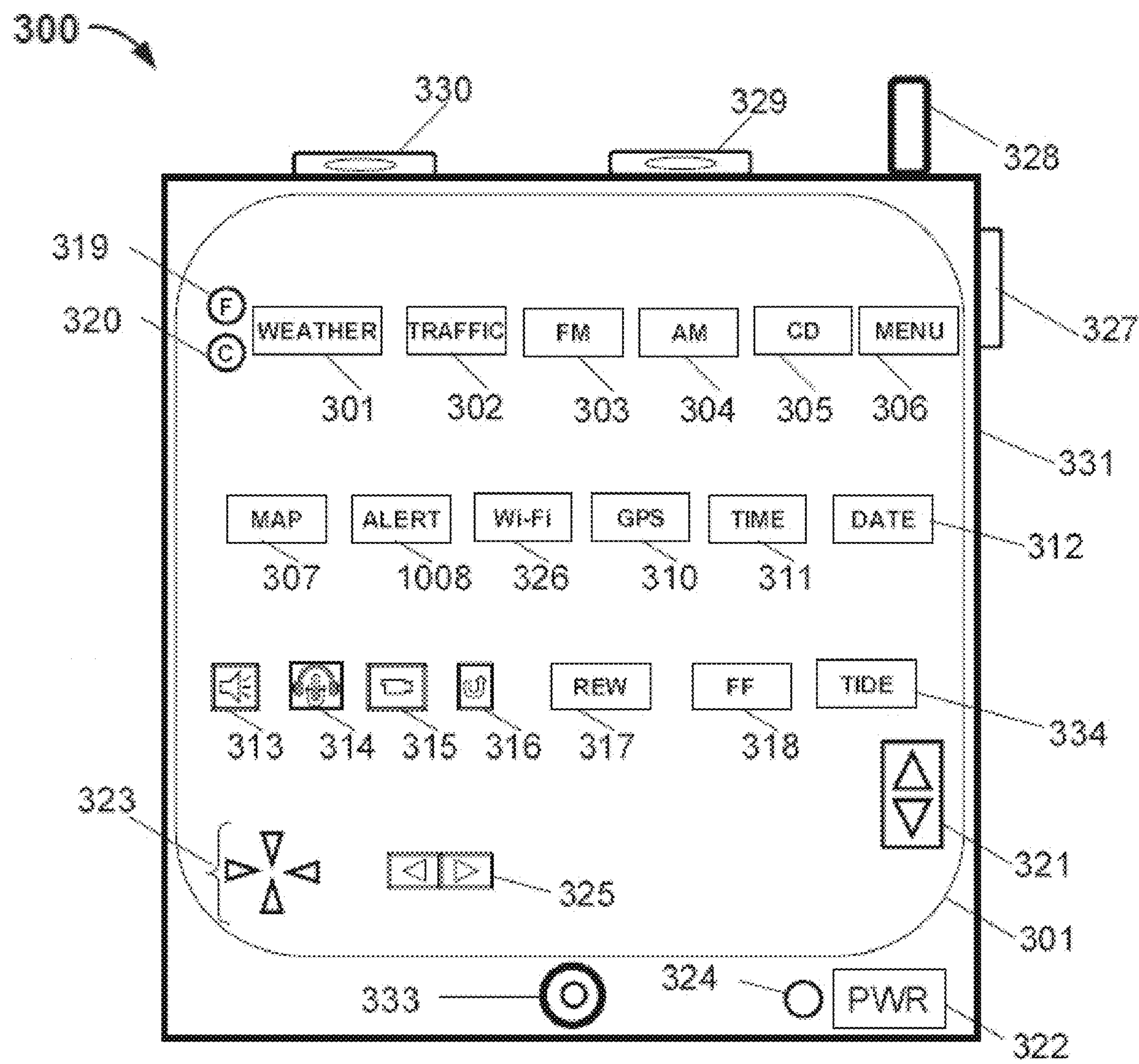
Figure 3C:
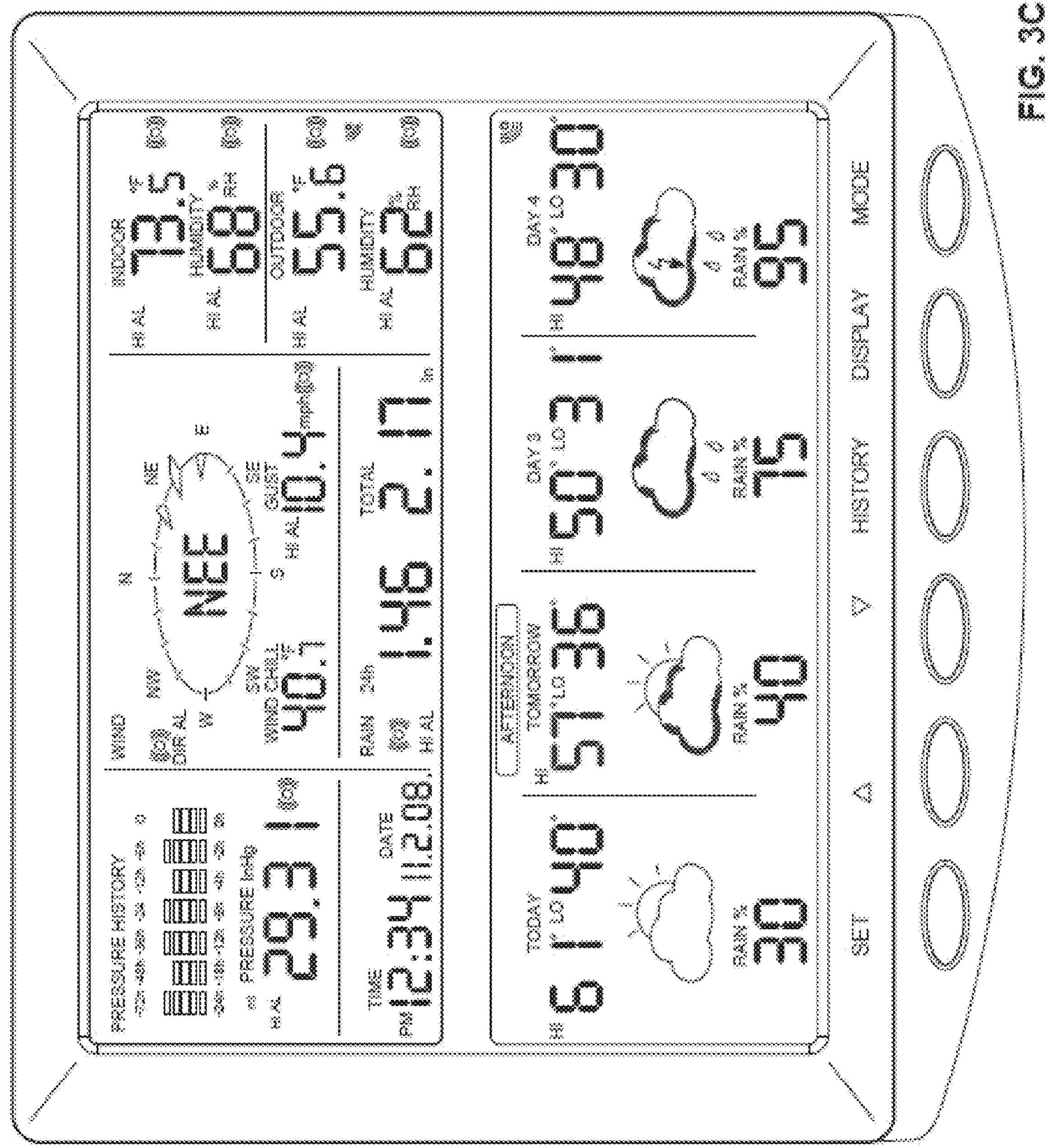
Figure 3D:
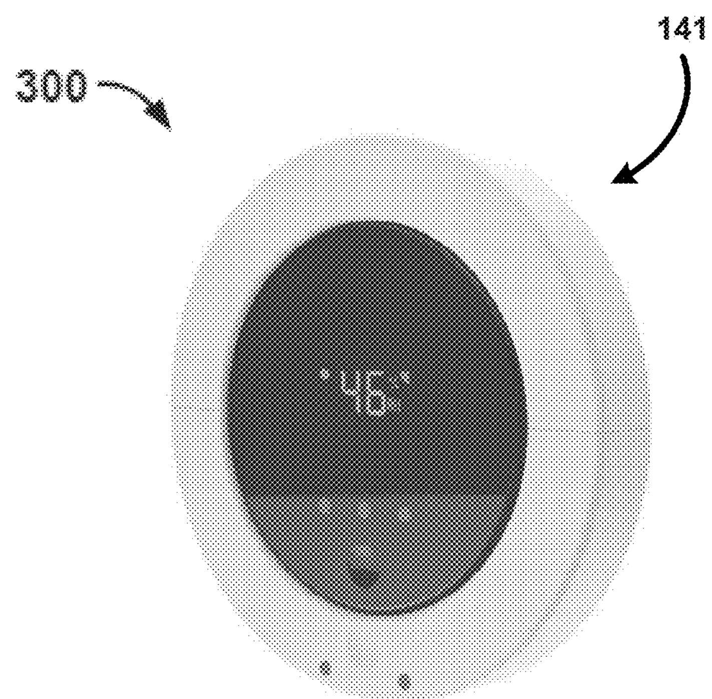
Figure 3E:
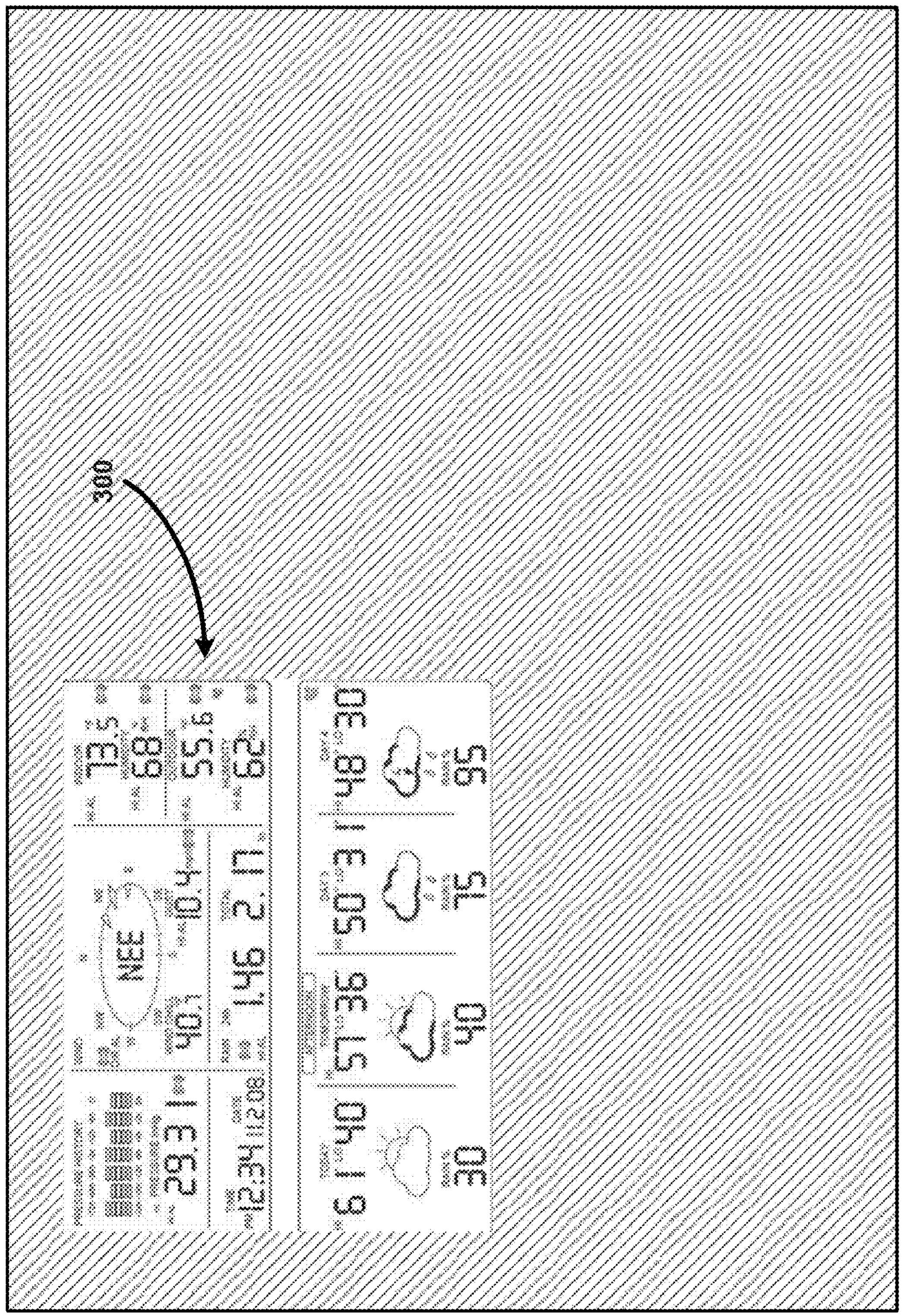
Figure 4:
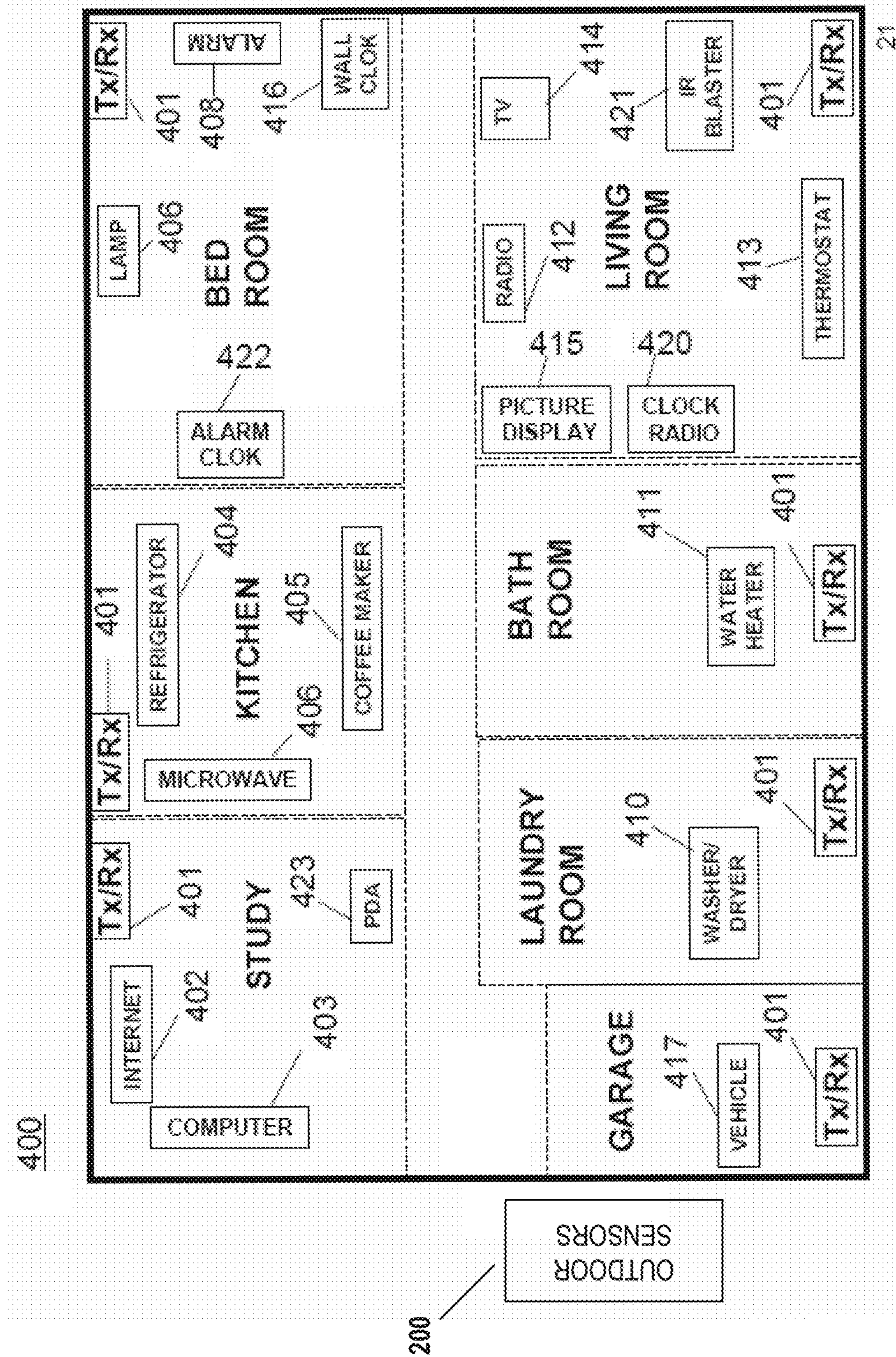
Figure 5:
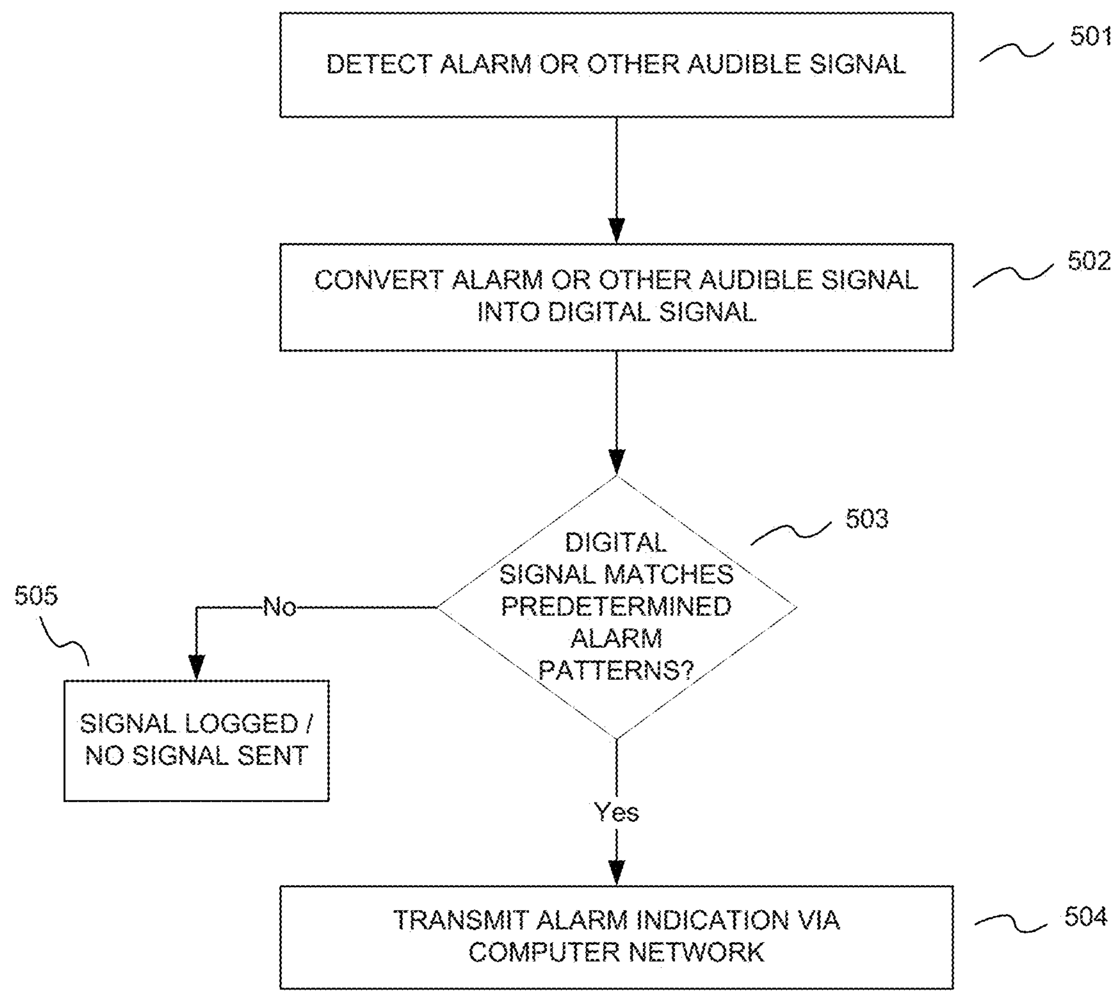
Figure 6:
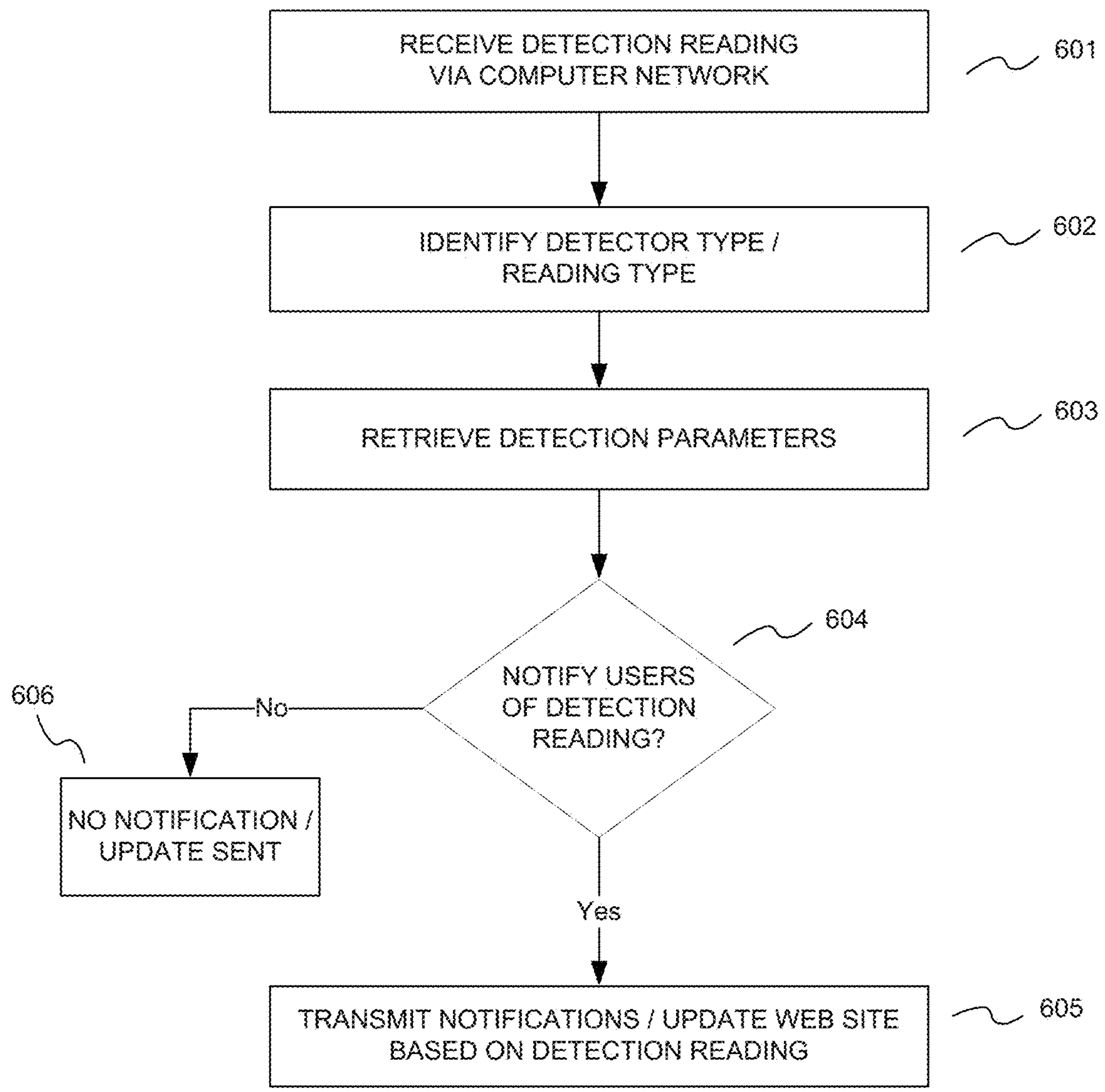
Figure 7:
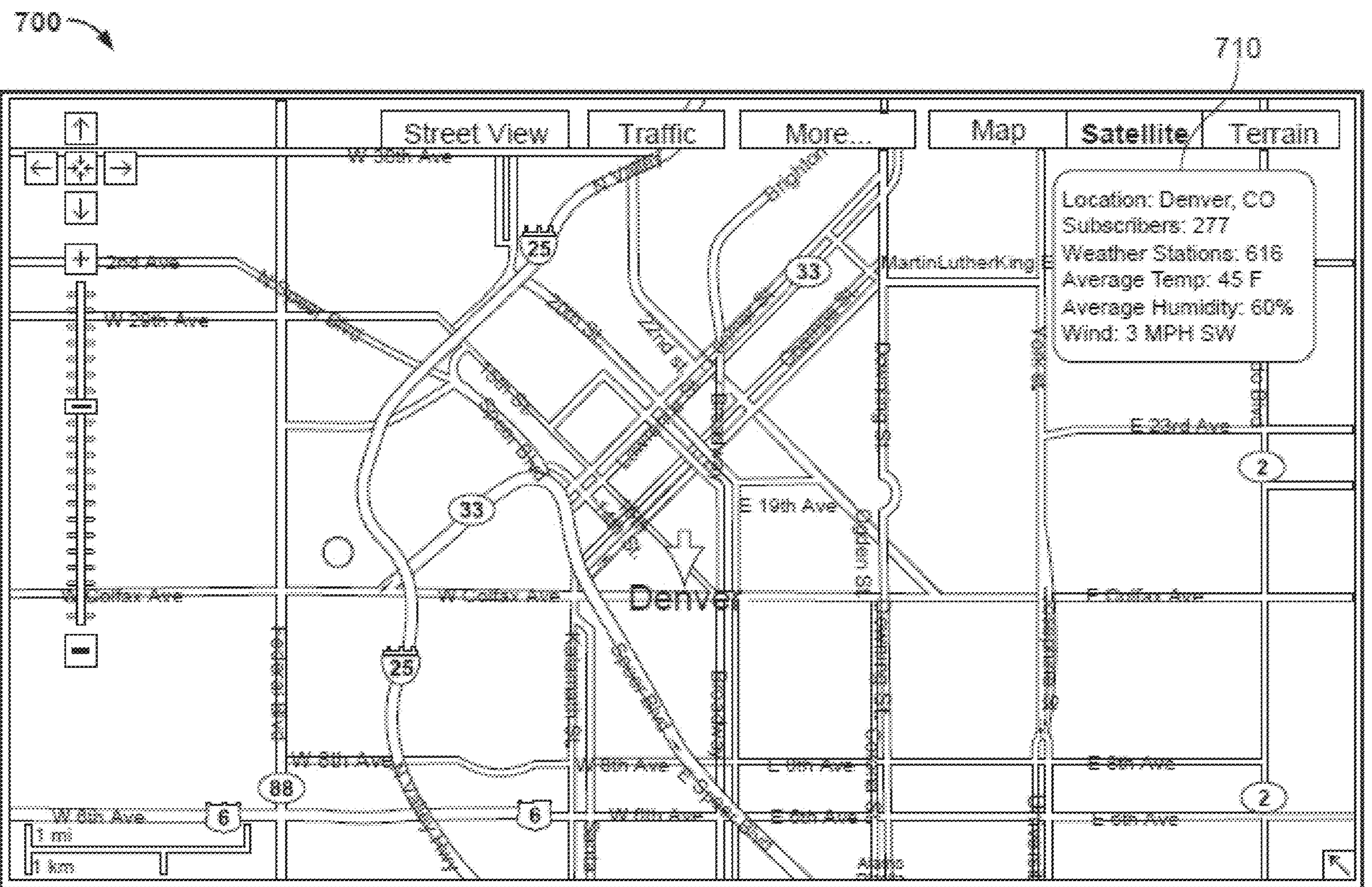
Figure 8:
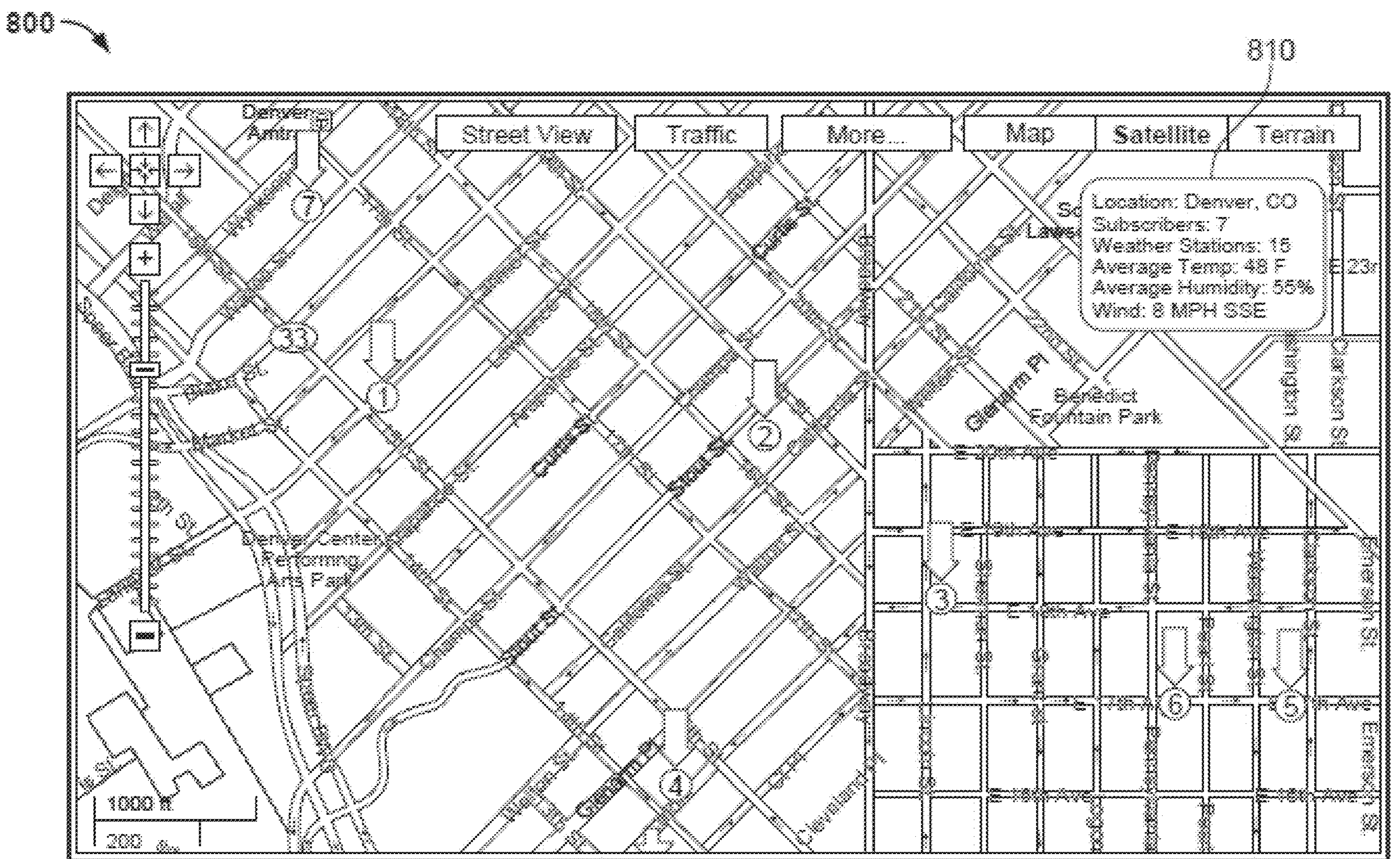
Figure 9:
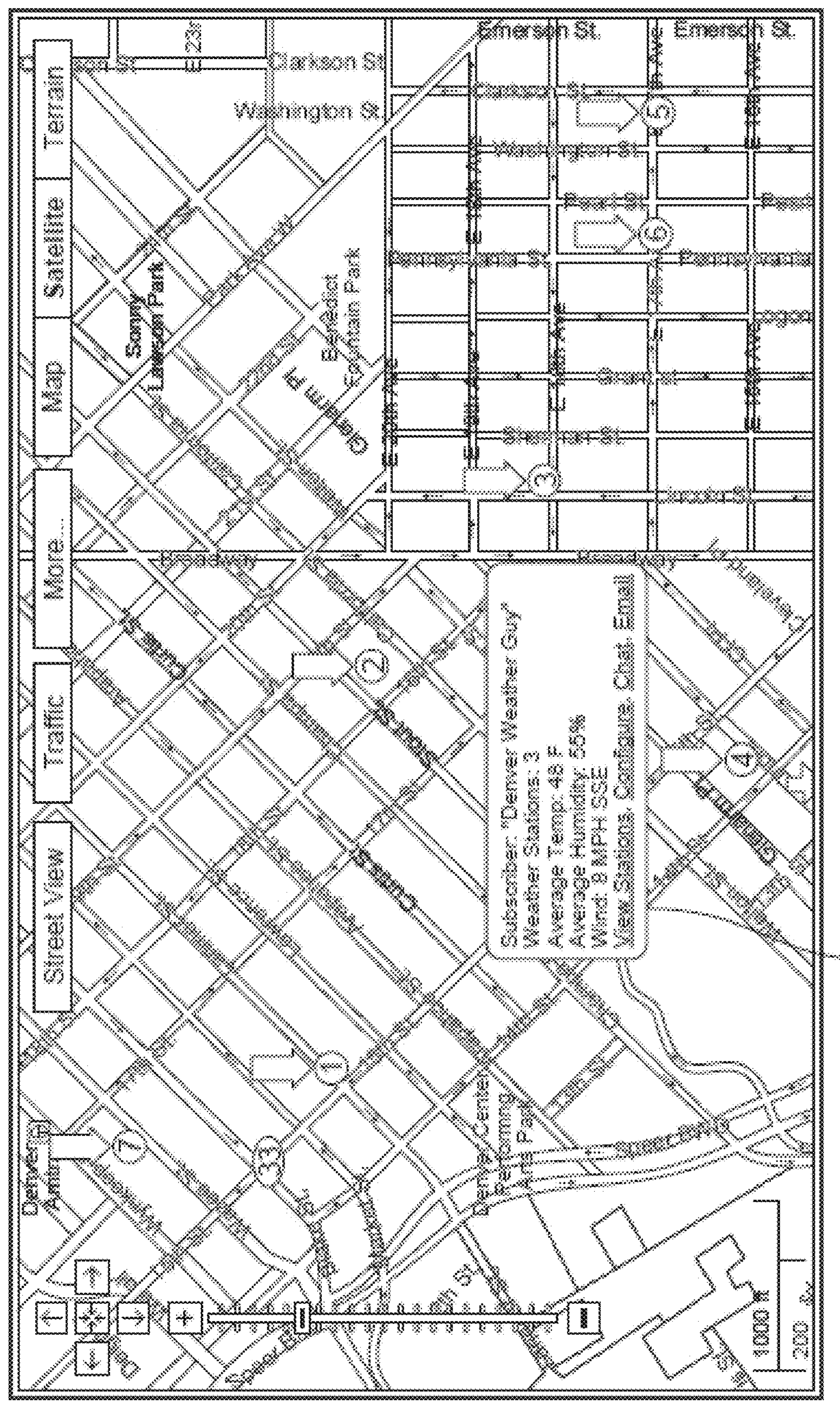
Figure 10:
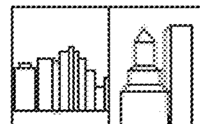
Figure 12:
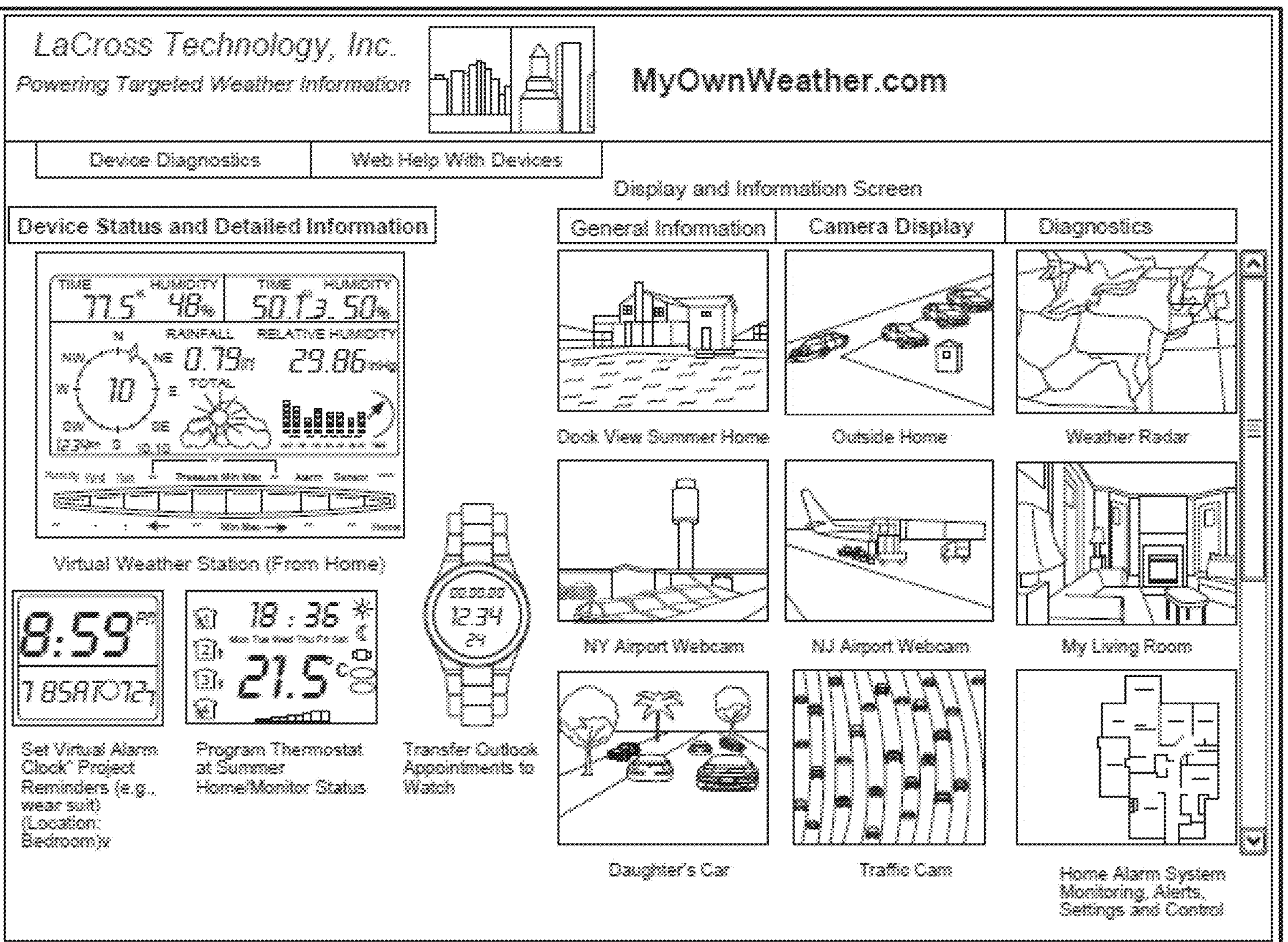
Figure 13:
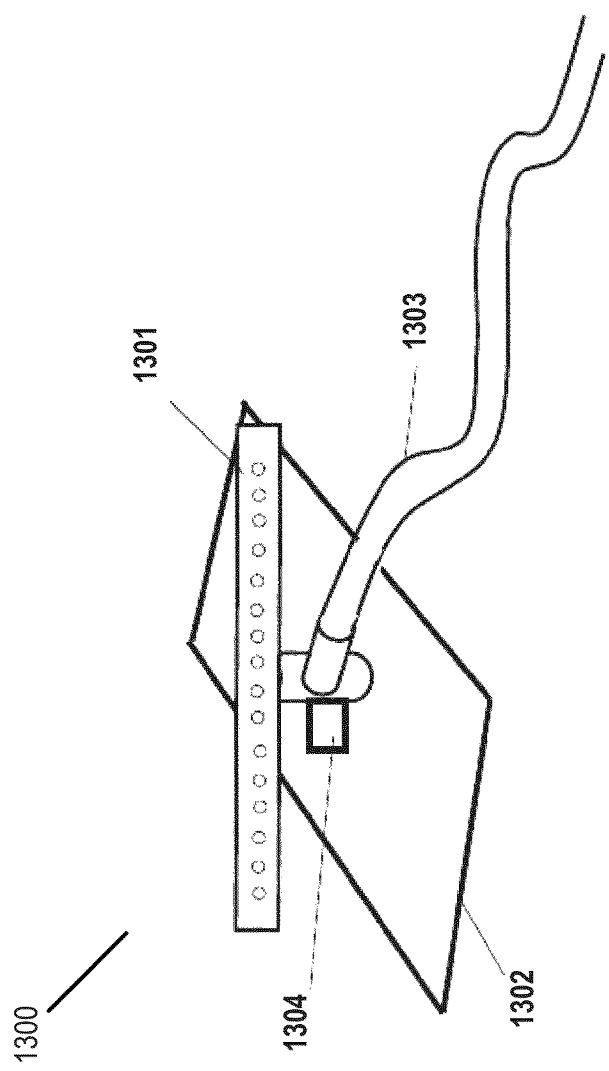
Figure 14:
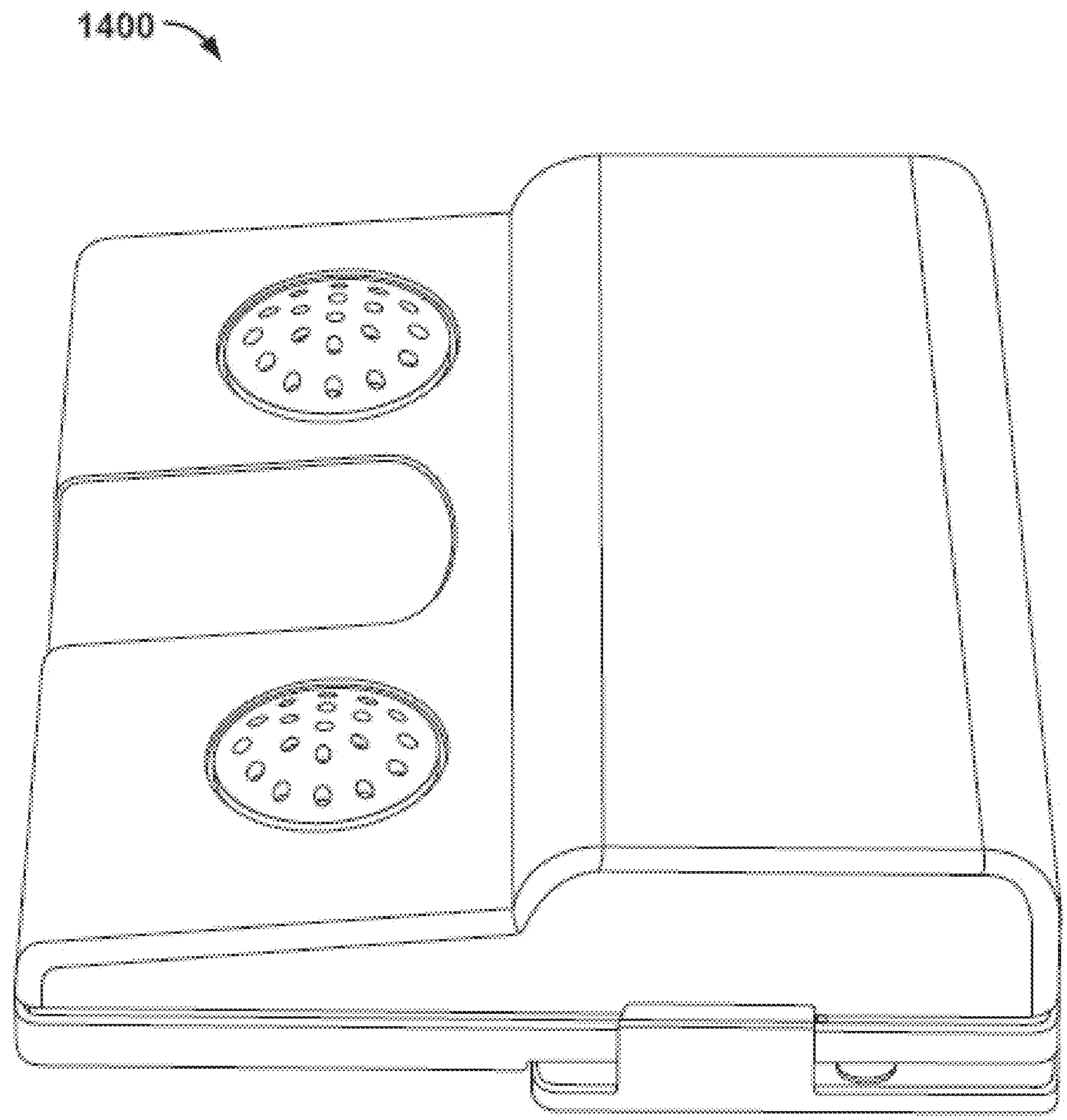

Having thus described the invention in general terms, reference will now be made to the accompanying drawings, which are not necessarily drawn to scale, and wherein:

FIG. 1 is a block diagram illustrating a computing device and network, in accordance with aspects of the present invention;

FIG. 2 is an illustrative detector system including one or more sensors, in accordance with aspects of the present invention;

FIGS. 3A-3E show illustrative receiver systems including user interface buttons and display screens, in accordance with aspects of the present invention;

FIG. 4 shows an illustrative remote location including receivers and sensors integrated into various appliances, in accordance with aspects of the present invention;

FIG. 5 is a flow diagram showing illustrative steps for providing an alarm indication based on a detection of an audible alarm at a remote location, in accordance with aspects of the present invention;

FIG. 6 is a flow diagram showing illustrative steps for notifying users based on a detection reading at a remote location, in accordance with aspects of the present invention;

FIGS. 7-9 are images depicting illustrative user interfaces based on underlying mapping software and features, and data based on the geographic region selected and/or a selected subscriber, in accordance with aspects of the present invention;

FIGS. 10-12 are images showing illustrative user interfaces provided by a server for viewing, configuring, and controlling devices at a remote location, in accordance with aspects of the present invention;

FIG. 13 is an illustrative appliance configurable to be controlled by a receiver via a wireless module, in accordance with aspects of the present invention; and FIG. 14 is an illustrative smoke detector detector device configurable to provide an alarm indication based on a detection of an audible alarm at a remote location, in accordance with aspects of the present invention.

Figure 15:
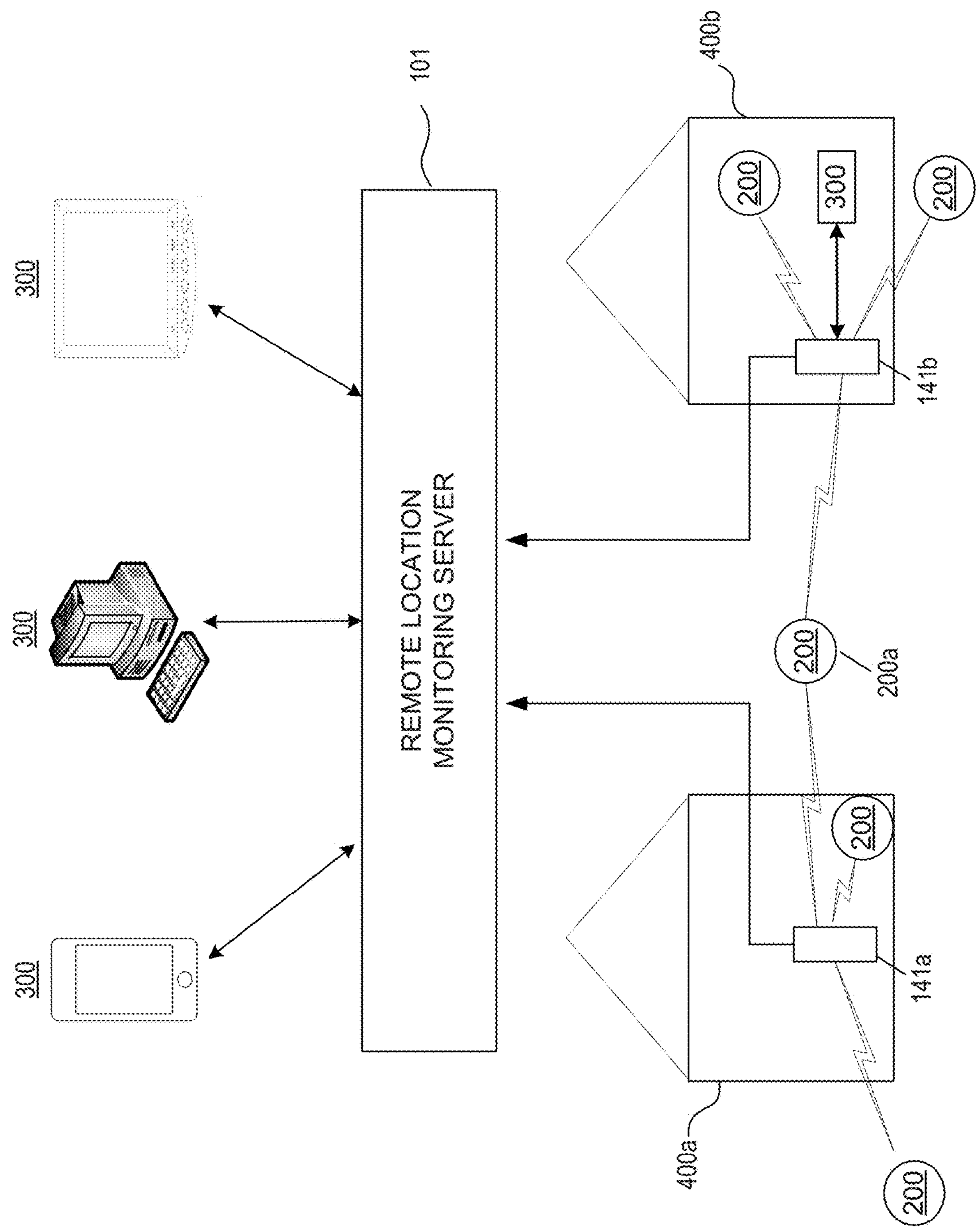
Figure 16:
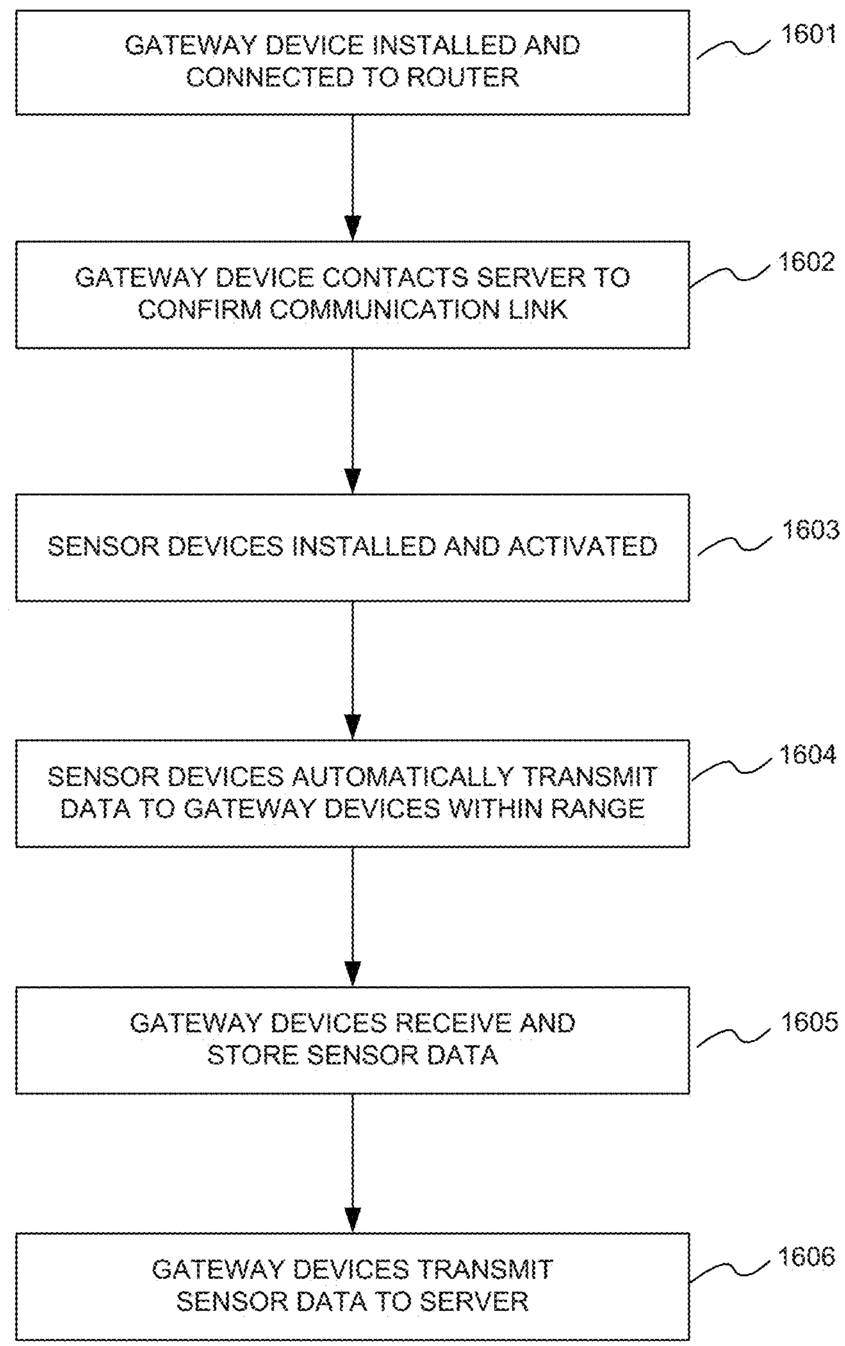
Figure 17:
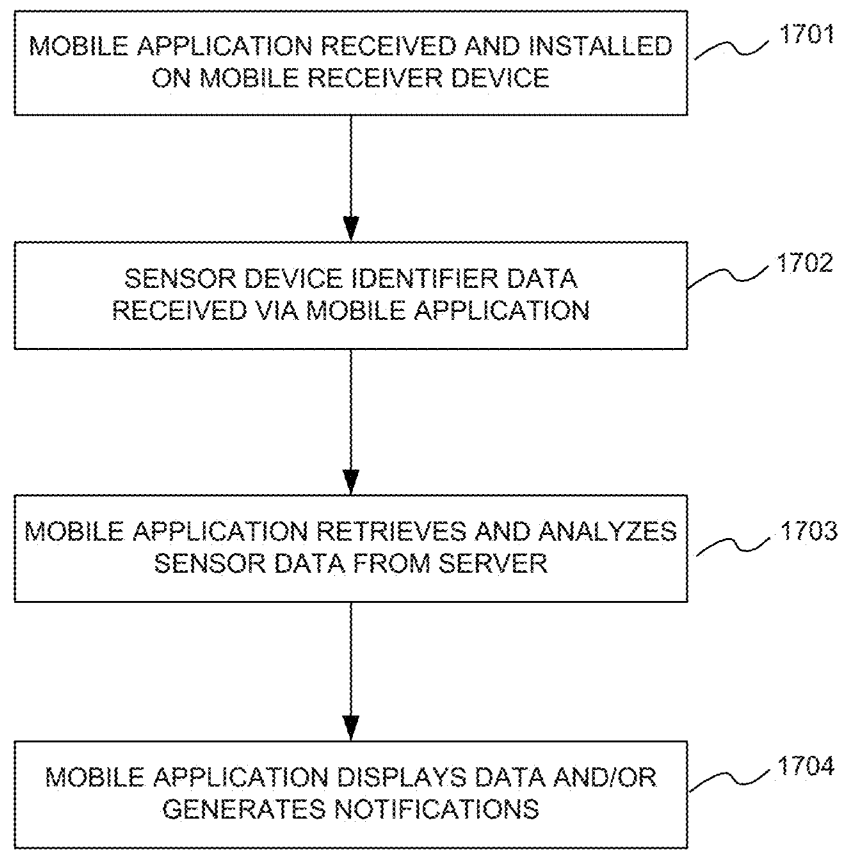

FIG. 15 is an illustrative remote location monitoring system, including one or more gateways and sensors, in accordance with aspects of the present invention;

FIG. 16 is a flow diagram showing illustrative steps for installing and setting up gateway devices and sensor devices in a remote location monitoring system, in accordance with aspects of the present invention;

FIG. 17 is a flow diagram showing illustrative steps for using a mobile application on a receiver device to receive, analyze, and display data from selected sensors in a remote location monitoring system, in accordance with aspects of the present invention; and FIGS. 18A-18D are illustrative user interface screens of an example remote location monitoring mobile application executing on a mobile receiver device, in accordance with aspects of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

According to certain aspects, the server 101 may operate in a networked environment supporting connections to one or more remote devices, such as gateway device 141, computer terminal 161, and gateway/computer combination 151. Gateway 141 is an illustrative home based network interface that may be used as an alternative device (rather than home or mobile computing devices) to communicate with the server 101 from remote locations. The gateway 141, computer 161, or combination terminal 151 may be coupled to a plurality of detecting devices and/or receiving devices via a suitable interface. For instance, the illustrative gateway device 141 may be capable of communicating with a large number of wireless devices (up to 120 in certain examples) in a weather station network system or home monitoring network system, at great distances designed to encompass an entire house and yard of a residence or a business environment (e.g., up to 300 feet in certain embodiments). The gateway 141 in this example may be connected to an Internet router via a LAN cable, and may receive electrical power via a supplied AC power adaptor. The gateway 141 may have a power consumption of just over 1 watt and may be designed to conform to all governmental and other energy saving requirements of home and office equipment. Thus, in certain examples, by using a gateway device 141 a remote location (e.g., home) may be equipped for remote location monitoring, and may join a remote location monitoring network (e.g., weather station monitoring network) without needing a home computer. In other examples, terminals 151-161 including computing devices may be used to communicate remote location monitoring data to and from the server 101. Terminals 151 and 161 may be personal computers or servers that include many or all of the elements described above relative to the server 101.

As described below, in certain embodiments a gateway 141 or other terminal 151-161 communicates wirelessly with at least one indoor sensor 200 (e.g., relating to home monitoring) or outdoor sensor 200 (e.g., relating to weather monitoring), and one or more receiver devices 300 to display data and/or control integrated appliances. The gateway 141 or terminal 151-161 may receive information from a network router that is connected via high-speed Internet to the Weather Direct servers which is connected to one or more Internet sites including a centralized server (see, e.g., www-.LaCrossetechnology.com, www.MyDataDirect.com, or www.weatherdirect.com) to transmit weather forecast data, traffic, music/sounds, news information, and any similar information to the receiver 300. The sensors 200, which may comprise of at least a temperature, humidity, and/or wind sensor, may also communicate to the receiver 300 the ambient conditions outside the user's home.

The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

In certain examples, the server 101 may communicate with one or more sensor devices 200 at remote locations (e.g., homes, businesses), for example devices including a series of sensors disposed external to the home for monitoring weather conditions. An illustrative example of an integrated sensor device 200 (e.g., detector) is shown in FIG. 2. Sensor 200 may be disposed external to a home, and may include one or more different sensing devices 202, such as humidity sensors, wind speed detectors, wind director detectors, static charge sensors, pressure detectors, visible light detectors, rain gages/detectors, pollen sensors, temperature gages, and other weather sensors. In other examples, the sensor 200 may be operative indoors at a remote location (e.g., home, business) and may relate to home monitoring. For example, as described in detail below, sensor 200 may comprise an audible detector 202 for smoke detectors, fire alarms, and/or burglar alarms. In other examples, the sensor 200 may comprise various other home monitoring sensors 202, such as a motion detector, power consumption monitor, standing water monitor, carbon monoxide detector, video camera, air quality detector, mold detector, network connectivity monitor, and/or other home monitoring detection devices described herein.

The sensor device 200 may include a processor 204 to evaluate signals and detection readings and/or a transmitter 206 to communicate its sensor readings to a computer or gateway device installed at the remote location. In certain examples, the sensor 200 may be removably attached to a computer 161 or gateway device 141, and may be physically connected to the computer 161 and/or gateway 141 (e.g., via a LAN network cable), or may be wirelessly connected (e.g., via radio network, Bluetooth, or other wireless network).

Sensor devices 200 may also be inter-connected to one or more receivers 300 (described below in reference to FIG. 3) to allow users to locally view the sensor readings and configure the sensors 200. For example, sensor devices may be disposed external to a home, but may transmit data to the server 101 via gateway 141, and may also transmit data locally to one or more receiver devices 300 inside the home. For instance, an integrated sensor device 200 disposed external to the home may include various sensing devices such as humidity sensors, wind speed detectors, static charge sensors, pressure detectors, visible light detectors, rain detectors, temperature gages, and other local weather sensing components. The sensor device 200 may also be removably attached to the receiver system 300 by the means of a snap member 330, wired to a receiver 300 (e.g., through the power system) and/or wirelessly connected, to allow a user at a receiver 300 to view readings from the sensor 200 and/or to configure the sensor 200 (e.g., power on or off, adjust sensor reading timing and schedules, set sensor detection thresholds, etc.). As described below, when local configuration of sensors 200 and viewing of sensor data is not available using local receivers 300 (e.g., when a user is away from home), the server 101 may support additional techniques to provide sensor data to users and allow users to configured sensors and receivers with integrated appliances in the system.

In some aspects the data may be transmitted from the sensor devices 200 only to the one or more receiver devices 300 inside the home, and the one or more receiver devices 300 may then forward the information to the server 101 via gateway 141 (e.g., the one or more receiver devices 300 may act as an intermediary). This may be desirable, for example, where one or more sensor devices 200 communicate wirelessly via low power interface circuitry (e.g., a 915 MHz ISM band transceiver). To facilitate the delivery of the data from the one or more sensor devices 200 to the server 101, gateway 141 and/or one or more receiver devices 300 may include interface circuitry compatible with the low power interface circuitry of the one or more sensor devices 200. In an aspect where, for example, the one or more receiver devices 300 include the compatible interface circuitry and the gateway 141 does not include the compatible interface circuitry, the one or more receiver devices 300 may communicate the data received from the one or more sensor devices 200 to or via the gateway 141 (e.g., for further transmission to the server 101).

Referring to FIGS. 3A-3E, illustrative embodiments of a receiver 300 are shown. Briefly, receiver 300 is a device configured to communicate with gateway 141 or other device, (e.g., terminals 151-161) for transmitting and/or receiving data from the server 101 or other remote network location. In addition to receiving information from the server 101 via gateway 141, receiver devices 300 may also have the ability to receive information from a multitude of information sources. For example, receiver devices 300 may also receive information regarding weather and other events via GPS, cellular towers, the Internet, and/or NOAA transmissions. For instance, a NOAA transmitter network utilizes about 900 transmitters, each having a roughly a forty mile radius, covering the entire United States. Although these transmitters currently do not provide sufficient specificity for many practical applications, embodiments of the present invention may include encoding the data from these transmitters to transmit specific location information along with alerts to users within specific geographic regions such as certain zip codes or zip plus four codes. As another example, when a receiver 300 is located in a mobile environment, e.g., when traveling down a road and/or in a train, the receiver's transceiver may come in contact with different cell towers. The receiver 300 may detect when it has left its home area and may display alternate information (e.g., weather displays for the new locality). In certain embodiments, a receiver 300 may be programmed to display weather data and/or other information most appropriate for its current position. For example, if the receiver 300 has just entered a new cell location, it may the weather for the area between its home location and the new cell location. In other embodiments, it may select an average weather for the entire cell location.

Returning to the illustrative receivers 300 of FIGS. 3A-3E. In this example, receiver 300 includes various user inputs and a display screen 332 which may be a touch screen 335. The receiver may be continuously powered or may be turned on by depression of a power button 322. The receiver may include a LED power indicator 324 and/or simply use the screen backlighting as the power indicator. The receiver may also include one or more network connection indicators for indicating a connection status for one or more devices with one or more computer networks (e.g., the network between the gateway 141 and the server 101, the gateway 141 and a home network, the receiver 300 and the gateway 141 and/or the server 101). The receiver 300 may be variously configured to include weather button 301, buttons 319 and 320 to select weather data in Fahrenheit and Celsius, respectively, emergency light(s) 323, speaker button 313, microphone button 314, video button 315, reset button 316, and volume button 325, and/or other suitable interface buttons. Various ports may be included to include additional modules such as GPS modules and/or other communication and/or sensor devices.

The receiver 300 may be implemented in a standalone configuration and/or coupled to one or more other receivers 300. The receiver 300 may alternatively be configured as low cost display station with the minimum components for receiving and displaying information to a user. Alternatively, the receiver 300 may be a weather station, wall clock with and/or without localized information such as weather and/or traffic information, bedside alarms with localized information such as weather and/or traffic information, and/or temperature display with and/or without local wireless connected sensors.

In addition to the current system, a GPS module may be included in the receiver 300. The GPS receiver may be permanently and/or detachably mounted to the receiver 300. Where the receiver 300 including a GPS module is a weather station, the device may automatically extract weather data based on the coordinates of the GPS system. These coordinates may come from the GPS module or may be input by the user manually. When the coordinates are derived from the GPS module, the weather station receiver 300 may translate the GPS coordinates to zip codes and/or zip plus four codes to extract the correct weather related data. Alternatively, the weather data may be sent coded for GPS coordinates and the zip codes entered by the user may be translated to select the corresponding GPS coordinates. In other embodiments, the GPS module may be located in a hand held unit by the user and/or in an external unit which is connected either wired or wirelessly to the weather station or weather receiver.

In certain embodiments, weather data and other information may be transmitted from a satellite to the receiver 300. The receiver 300 may use the same antenna as the GPS unit and/or alternatively may use another antenna such as a satellite radio antenna. Where weather data is transmitted using a data feed of a satellite radio, it is preferred that the weather data be encoded with geographic data such as zip code and/or zip plus four code as discussed above. In embodiments where the GPS antenna or satellite antenna is utilized, the antenna may be utilized in a similar fashion as is currently employed for transmission of conventional data. In this manner, weather data may be provided to any location in the world by virtue of an up link to a satellite, down link to through the GPS/satellite radio interface. Similarly, customized weather data may be provided via DVB broadcast to local receivers. The local receivers may input zip codes and/or zip plus four codes and utilize these codes to filter incoming weather data. Accordingly, satellite receivers may contain one or more virtual channels depicting current weather conditions for any number of user selectable zip codes based on set-up data entered by the user at the time the satellite system is configured and/or installed in the user's home.

Additionally, both sensor devices 200 and receiving devices 300, may for example, be variously configured and integrated into cell phones, GPS receivers, alarm clocks, clock radios, wall clocks, PDAs (personal digital assistants), walkmans, digital cameras, dictaphones, cars, airplane seats, iPods, fog free mirrors, television or content consumption devices (e.g., VCRs, DVD players, Blu-Ray players, set-top boxes) and other similar such devices. For devices that do not require the use of a computer for setup, adjustments and inputs can be made by remote control, manual inputs, configured using USB connections, or other type data inputting system. The interface circuitry for each of the sensor devices 200 and receiver devices 300 in a home network may include a router and/or be coupled to a home gateway 141, hotspot router, or other terminal device. For example, a single device may comprise circuitry for the gateway 141, one or more sensor devices 200 and one or more receiver devices 300. The single device may enjoy the benefits of such combined circuitry (e.g., the device may have the features of the gateway 141 discussed above, one or more sensor devices 200, and one or more receiving devices 300). Where the circuitry is coupled to a gateway wirelessly, it may be coupled using 802.11 a-g, n, and/or a lower power interface circuitry such as 915 MHz ISM band transceiver. In either event, sensors 200 and/or receiver 300 may include an Ethernet controller, Wi-Fi receiver, or Bluetooth technology.

As illustrated in FIG. 4, receivers may be included in a variety of devices and appliances. Referring to FIG. 4, the home, business, or other enterprise 400 may include one or more transceivers 401. In a typical installation, only a single transceiver 401 is utilized for proper reception. In other embodiments where the home is extremely large or has concrete infrastructure, more than one transceiver 401 may be helpful. Other receivers in the home such as a PDA 423, appliances integrated with receivers such as microwave 406, coffee maker 405, refrigerator 404, and/or other devices integrated with receivers such as alarm clock 422, lamp 406, alarm 408, wall clock 416, care information center 417, outdoor sensor(s) 200, washer/dryer 410, water heater 411, bathroom heater (not shown), picture display 415, TV set 414, IR blaster (e.g., a remote) 421, thermostat 413, and/or clock radio 420 need only have a short range, low power, receiver for receiving data. In this embodiment, a single receiver 300 with a transceiver device 401 may be utilized to distribute data to every device in the home 400 in a very low cost information distribution network.

As discussed above, in some aspects one or more receivers 300 may be included in various appliances and/or fixtures. For example, referring to FIG. 3*e*, one or more receivers 300 may be included in a fog free mirror 360 for in a bathroom or other room in the premises. The fog free mirror 360 may be, in some aspects, a mirror may be specially formulated or coated so as to prevent the formation of fog, mist, residue, or condensation, or other water or liquid buildup on its surface. A portion of the mirror surface may be removed or specially-tinted so that a display screen of a receiver 300 may be visible in the mirror. In some aspects, the tint may be electrically controlled, e.g., by application of a voltage or current to the fog free mirror 360 or a portion thereof may increase the transparency of the mirror, causing the mirror or portion to act as a window and rendering a display of a receiver 300 to be visible.

In some aspects, the electrical components of a receiver 300 may be hermetically sealed (e.g., one or more processors of the receiver may be hermetically sealed) and/or shielded from the elements (e.g., weatherproofed, water-resistant, or the like), and/or components may be placed in a water-tight component. For example, using the fog free mirror example, the mirror may have one or more antennas, memory, processors, or other like electrical components positioned in a hermetically sealed compartment, which may communicated via shielded wires (or wirelessly) with a display which is positioned in a fog-free portion of a mirror. The mirror may comprise one or more capacitive, inductive, or other electrical components and/or elements to provide "touch-screen" functionality so that a user may interact with the receiver (e.g., change the informational elements presented and so on.) As discussed, the receiver 300 located at the fog free mirror may additionally or alternatively be controlled via operation of other devices (e.g., via instructions communicated via gateway devices and/or computing devices 141, 151, 161, and so on).

Certain items in the house 400 may also be interconnected using transceivers. For example, the home security alarm and/or the bed side alarm may be interconnected. In this manner, the home alarm may be deactivated 30 minutes after the user awakes so that it is not triggered by the user venturing outside to read his morning paper. Further, a user who set an alarm to wake up at 6 a.m. is also able to have the alarm communicate with other devices in the house. For example, the user may selectively turn down the heat at night by 10 degrees and turn the water heater down by 15 degrees and shut down the lights and other suitable energy saving mechanisms. In a similar fashion for a period of either 20 minutes, 30 minutes or other user selectable time prior to the selected alarm time, the alarm clock and/or transceiver 401 may signal other apparatus in the house to, for example, turn on the coffee maker 405, turn up the heat in the water heater 411, turn on a bathroom heater, turn up the temperature in the house, and set other functions responsive to the time the alarm is set to go off.

Having described various devices and components of certain illustrative systems, FIGS. 5 and 6 relate to methods and other techniques for performing remote location monitoring. Referring now to FIG. 5, a flow diagram is shown describing illustrative steps for providing an alarm indication based on a detection of an alarm or other audible signal at a remote location.

In step 501, an audible signal is detected at a detection device 200 (e.g., an audio sensing device) at a location such as a house or business. In this example, a sensor 200 may be configured to record and evaluated each audible sound in its vicinity over a predetermined decibel level. Thus, if the sensor 200 is operative at a residential location, it may be exposed to sounds such as voices, doorbells, ringing phones, barking dogs, and noises from televisions, stereos, and other appliances.

In step 502, the audible (analog) signal is converted into a digital signal within the sensor 200, and in step 503 the digital signal is compared to one or more previously stored digital signals corresponding to alarm signals that may sound near the sensor 200. For example, the sensor 200 may be preprogrammed with one or more distinct digital audio patterns corresponding to alarms from a smoke detector, fire alarm, burglar alarm, and other alarm systems active at the location of the sensor 200. For instance, the sensor 200 may automatically recognize (e.g., by frequency, pitch, volume, etc.) an alarm sound from a standard smoke detector and thus need not be especially programmed by a homeowner or other user in order to identify an alarm signal. In other examples, a sensor 200 may be programmed by a homeowner or other user to 'learn' and respond to specific sounds within range of the sensor 200. For instance, if a monitored home has burglar alarm with a unique (or customized) sound, a programmable sensor 200 may be used to record and store the alarm sound during an initialization process so that the sound can be recognized during subsequent comparisons in step 503. Additionally, although this example describes standard and customized alarm signals that are stored at the sensor 200, it should be understood that the standard and/or customized digital alarm patterns may be stored outside of the sensor 200 in other examples. For instance, a standard library of digital alarm patterns may be stored within the gateway 141 or terminal 151-161 at the same location, or remotely at the central server 101.

If the audio signal detected by the sensor 200 corresponds to an alarm signal (e.g., smoke detector, fire alarm, burglar alarm) (step 503:Yes), then in step 504 an alarm indication is transmitted from the sensor 200 via a computer network to the gateway 141 and/or additional network and system components. As described above, the sensor 200 may transmit alarm indications via gateway 141 (or other terminal 151-161) to a system server 101. In this example, the server 101 may be responsible for transmitting notifications to users and/or updating resources (e.g., event maps, system logs, status web pages), as described below in reference to FIG. 6. In other examples, a terminal (e.g., 151-161) at the location of the sensor 200 may alternatively perform these functions.

In this example, if the audio signal detected by the sensor 200 does not correspond to an alarm signal (step 503:No), then the sensor 200 will not transmit an alarm indication to the gateway 141 (step 505). Thus, if the sound detected in step 501 was not an alarm (e.g., ringing phone, barking dog, television), then the sensor 200 would not transmit an alarm indication. Of course, in other examples, the sensor 200 may be configured to provide indications based on other sounds besides alarms. For instance, the same sensor 200 or a different audio sensor 200 may be programmed with a home doorbell audio pattern, and may transmit a doorbell indication upon detection of the doorbell sound.

Although FIG. 5 relates to sound detection of an audible alarm signal, it should be understood that other examples may be implemented based on the functionalities of various other types of sensors 200. For example, a water detector 200 on the basement floor at a house may be used to provide notifications to a homeowner whenever the basement floods, using similar steps to those described in FIG. 5 to provide the notifications. As another example, a power consumption monitor 200 may be used to provide notifications to users when a home appliance or computing device is malfunctioning. Additional examples may relate to notifications based on detected weather conditions. For example, a user may register to receive notifications based on one or more weather conditions detected by an external weather sensor 200 at their residence or other location. For instance, users may receive external temperature notifications (e.g., temperature reading above or below a threshold value), wind notifications (e.g., wind gust above a threshold value), and other notifications based humidity, pressure, daylight, precipitation, and other weather conditions.

Referring to FIG. 6, a second flow diagram is shown describing illustrative steps for notifying one or more users based on an alarm indication or other detection reading from a sensor 200. In step 601, a detection reading is received from one or more sensors 200 via a computer network at a computing device. In certain examples, the steps of FIG. 6 may be performed by the server 101, or other computing device that receives data from one or more sensors 200 (e.g., gateway 141, terminals 151-161). As described above, a central server 101 may be configured to receive detection readings from a plurality of sensors 200 operative at a plurality of different remote locations (e.g., via gateways 141 at different residential or business locations).

In step 602, the server 101 identifies the detection reading and determines a detector type and/or data type for the reading. For example, the received data may correspond to a temperature reading from an external weather sensor 200 at a residential location. In this example, data transmission from the gateway 141 may include sender and/or header information allowing the server 101 to identify the gateway 141, the sensor 200, and the type of data being transmitted.

In step 603, the server 101 may retrieve a set of detection parameters based on the location, detector type and/or data type information identified in step 602, and in step 604 a determination is made whether or not to notify users of the received detection reading. As an example, a user may register to receive a notification every time a temperature reading below freezing is recorded at an external temperature sensor 200 outside the user's home. In this example, the notification parameters may comprise a user identifier, a sensor identifier, and a temperature range (e.g., <32° F.), and the parameters may be stored at the server 101 to be retrieved whenever a new temperature reading is received from the user's external weather sensor. As another example, a user may register to receive a notification every time a new temperature reading is received from the user's external sensor 200, regardless of the temperature of the readings. Thus, less parameters (or even no parameters) might be stored at server 101 in certain notification examples (e.g., requesting a notification every reading, every other reading, every 5 minutes, etc. from a designated sensor 200).

Although the above examples relate to notifications based on temperature readings at an external weather sensor 200, it should be understood that notifications may be based on other types of sensors 200 (e.g., wind, light, pressure, humidity, precipitation, audio, motion, alarm, power consumption, and other home monitoring and/or weather sensors). It should also be understood that the numbers, types, and values of the parameters stored at server 101 for the different sensors 200 may depend on the type of sensor 200 and the sensor data being received. For instance, a server 101 may be configured to notify a homeowner every time an audio alarm sensor (e.g., a smoke detector detector as discussed above in FIG. 5) transmits an alarm indication. However, the homeowner might only request power consumption notifications when several consecutive power consumption readings for an appliance with an integrated receiver 300 indicate that the appliance is malfunctioning. Additionally, as described below in reference to step 605, the notification parameters retrieved in step 603 may relate to the type of notification the user has requested (e.g., call, email, page, text message) may include one or more notification recipient addresses.

In step 604, the server 101 compares the previously stored notifications parameters to the received data to determine if a notification should be sent. Thus, in the example mentioned above, if the user has registered for below freezing weather updates and a temperature reading of 38° F. is received from the user's external weather sensor 200 (604: No), then a notification should not be provided based on that reading. However, if a subsequent reading of 30° F. is received from the user's external weather sensor 200 (604: Yes), then a notification should be provided in accordance with the user's notification registration in step 605.

In step 605, one or more notifications are provided in accordance with the user's notification registrations. As discussed above, in certain examples, users may register to receive a combination of the telephone call notifications, email notifications, pager notifications, text message notifications, and/or instant message notifications based on detection readings received from sensors 200 associated with the user's accounts. For example, a user may register to receive an email notification every time an external wind sensor 200 at the user's house reports a wind gust of greater than 20 MPH. However, the same user may register to receive a work phone call, a phone call to a secondary phone (e.g., a spouses phone), a text message to a mobile phone, and email notifications whenever an alarm signal is indicated at the user's home from an alarm sensor 200 (e.g., a smoke detector detector), or a possible intrusion is indicated by a motion sensor 200. Notifications may also be based on combinations of readings from one or more sensors 200 (e.g., notifications for wind gusts sustained over a specified amount of time, notifications for wind gusts with concurrent rain readings, notifications for cold temperatures with concurrent power failure readings at a water heater or other appliance). Additionally, users may be permitted to register for notifications based on the sensor readings of other users' sensors, for example, sensors installed by friends, family members, neighbors, or from community sensors which provide public readings available to all system users with access to the server 101. For example, a user might register for email notifications whenever the temperature at the user's parent's house is greater than a temperature threshold (e.g., <95° F.). As another example, the user may request weather alerts for severe weather (or normal weather) anywhere within the user's vicinity (neighborhood, zip code, distance radius, etc.).

In addition to notifications sent directly to users, notifications can take the form of updates to a resource accessible to one or more users. For example, in addition to (or instead of) direct weather notifications, a user may register to be part of a weather community in which readings from the user's weather sensor 200 are added to a publicly available web site, such as community weather map or weather event chart.

In the example of FIGS. 7-9, a web page provided by server 101 of the weather system displays a view of a residential area near Denver, Colo. In this example, weather system users in this region may register to join their local weather community. For users that join the weather community, data from their external weather sensors 200 may automatically be integrated into a community web page 700 which is accessible to other users in the community. The community web page 700 may comprise a weather map and/or weather event table including real time updates of the weather in the region. In this example, after a user accesses the web site and selects the displayed region 700, a data summary box 710 will appear in one corner of the map to show a compilation of subscriber and weather data for the visible area. As shown in FIG. 7, the system may automatically display the total number of weather system subscribers and active (online) weather display devices in the selected region, along with the average temperature, humidity, wind, and/or other summary weather data. The data may be calculated automatically at the central server 101 using all of the active weather stations in the selected region. The weather system may also leverage the different features of the underlying mapping software (e.g., Google Maps®, Microsoft Virtual Earth®). Thus, in this example, the user may be able to zoom-in or zoom-out, causing the data summary box 710 to automatically refresh the displayed data to match the updated geographic region displayed on the screen. Similarly, the map feature may permit online users to change to a zip code view, city view, county view, etc., or any other view configuration supported by the underlying mapping software. Additionally, weather data (e.g., satellite data) may be received by the server and superimposed over the map requested by the user.

Referring now to FIG. 8, the subscriber has used the map feature to zoom into a smaller geographic region, causing an automatic update in the summary and compilation data shown in box 810. Additionally, in this example, the weather system central server has made a determination that the selected region is small enough to display an icon and number for each subscriber in the area. In FIG. 9, the user has activated a subscriber information window 910 by selected (e.g., clicking) on the individual subscriber icon/number "4" from FIG. 8. In this example, the subscriber information window contains the subscriber name, device data and weather data received from the subscriber's device, along with several links to allow the user to communicate with the selected subscriber and/or the subscriber's devices (e.g., view stations, configure stations, email, or send an instant message). Thus, if the clicks on the "Email" or "Chat" links, the weather system may initiate an email or instant messenger application with the selected subscriber's information to allow the user to communicate with that subscriber. In certain examples users may have the option to disable their own "Email" and/or "Chat" links so that their personal information (e.g., email address or instant messaging identifier) is not accessible to other subscribers. Additionally, in this example, after selecting the "View Stations" link to see, the user may be presented a home device map similar to the illustrative screen shown in FIG. 4. This link may also be used to retrieve data from any accessible weather display device (i.e., devices not permissioned by the owner subscriber as hidden, or marked as private, etc.), or to configure/reprogram data one of the weather display devices (similarly, owners subscribers may set permission on all or some of their devices to allow/disallow remote configuration by third-parties.

According to additional aspects, sensors 200 and/or receivers 300 at a remote location may be controlled by commands from the server 101, based on user interaction with the server user interface (e.g., a web site or other server application). For example, as discussed above, the server 101 may provide a user interface to allow users to register (e.g., add or remove) sensors 200, view sensor readings and status, and to register for notifications by selecting one or more sensors 200 and designating the desired notification parameters. Using a similar system and set of components, users may interact with a server 101 user interface (e.g., web site) to configure sensors 200, appliances with integrated receivers 300, and other devices connected to the user's gateway 141 (or terminal 151, 161, etc.). Thus, in addition to basic home monitoring functions, remote device/appliance control at a user's home or other remote location may be supported using a similar monitoring infrastructure. As an example, a receiver unit 300 may be integrated into a home automation system so that the unit would, for example, close windows when rain is detected by the external rain sensor 200, or when the receiver 300 receives an indication from the server 101 that there is a high probability of rain at the user's home location.

Certain examples provide for determining the geographic location of a device (e.g., gateway 141 or terminal 161) using an IP address reverse lookup table or similar reverse geographic location technology either implemented locally at the server 101 or at the remote location of the device to determine the geographic location of the device and using this information cross to correctly displayed sensor information received from the device on a map 900 or other user interface.

As mentioned above, according to certain aspects, users may control remotely sensors 200, receivers 300, and other receiver-integrated appliances connected via gateway 141 or other system components in a home monitoring system. For example, the server 101 may provide a user interface (e.g., web page) to allow authenticated users to remotely configure sensors 200 and control connected devices and other appliances via the Internet. Additionally, users may configure the server 101 to control sensors 200 and devices/appliances with receivers 300 automatically to take certain actions based on home monitoring alerts, weather conditions, and other information available to the server 101. For example, if the server 101 was alerted to a child abduction (e.g., Amber alert) or a criminal escape in the vicinity of a user's home (e.g., via a news notification service), the server 101 may be configured to automatically close and lock the doors in the home, close the windows and/or turn on an alarm system. As another example, in response to a tornado warning alert, the server 101 may be programmed to automatically close storm shutters for all homes in the area of the alert. In other examples, a home monitoring system may have motion detectors and sound detection sensors 200 that would alert the central server 101 to potential intrusions. In this example, after receiving a notification of a potential intrusion (wherein the sending of the notification was based on the user preferences and configuration of the server 101), the user may then be able to login to the server 101 to view additional information regarding the potential intrusion (e.g., an image taken from a motion activated camera 200, or a sound recorded by an audio sensor 200). Based on this information, the user may activate remotely certain devices within the home (e.g., door locks, windows, safes, other appliances) and/or may notify law enforcement or family members. Thus, in certain examples, the user interface of the server 101 may support functionality for users to directly control sensors 200 and/or appliances and device integrated with receivers 300 remotely (e.g., engaging door and window locks, turning appliances and alarm systems on and off, etc.) within the user's home or business location. In other examples, the server 101 may be programmed to automatically take actions even without the explicit directions of a user. For example, upon identifying a potential intrusion at the house via a motion detector 200, the server 101 may transmit an instruction via gateway 141 to automatically close and lock the doors and windows in the house. The server 101 may then notify the user of the potential intrusion and/or may alert law enforcement through an E911 system or PSTN system.

Referring now to FIG. 10, an illustrative screen shot is shown allowing an authenticated user to configure various sensors 200 and receiver appliance devices 300 at a remote location to be automatically controlled by the server 101. In this example, the devices 200-300 at the remote location may be controlled using an Internet Protocol (IP) via gateway 141. Therefore, the interface may be customized such that different manufacturers may design to the protocol. For example, by using plug and play techniques, simply installing a new appliance (e.g., a furnace, an alarm clock, a new car, a new refrigerator, a new television, a new phone, the device connects with, for example, gateway 141 and/or terminals 151-161, determines the home to which they were installed, and registers with the users home automation control panel, e.g., www.mydatadirect.com or www.WeatherDirect.com. The goal of the unified interface for different appliances is to have a single unified standard to simplify interconnectivity for the user. Where the different consumer electronics suppliers standardize on a single interface (e.g., 802.11 a-g, n) and a single protocol, e.g., PCMIA plug and play like protocol, then the consumer experience is substantially enhanced. Further, one manufacturer can sell many additional products to the same family over time by staging the cost of the acquisition. For example, the children can purchase their parents an alarm clock one holiday, an outdoor sensor kit another holiday, a web cam for the grandchild's outdoor play area another holiday, etc.

Referring now to FIG. 11, the setup and configuration data is downloaded from the device connected to the user's network. In this example, the device being configured may be an external temperature sensor 200 for detecting and providing temperature data to the server 101. The temperature sensor 200 in this example may be configured to communicate wirelessly with the gateway device 141. In certain examples, a temperature sensor 200 may have a wireless range of approximately 300 feet. The temperature sensor may also be battery powered, avoiding the need to position the sensor next to an electrical outlet. In addition to the temperature data, the sensor 200 may also be configured to monitor and transmit humidity data. The sensor 200 in this embodiment may include an extendable probe (e.g., 6 feet in length) that can detect and communicate an additional temperature and/or humidity reading, for example, from a swimming pool or spa, refrigerator, freezer, etc. Although the sensor 200 may be configured to detect and transmit temperature and other data immediately (i.e., in real time), it may also be configured to store history data for a period of time (e.g., days, weeks, or months) and transmit the stored data upon request, for example, as a spreadsheet file compatible with Microsoft EXCEL® and/or other third-party software applications.

Referring now to FIG. 12, an additional display is shown of an illustrative user interface provided by the server 101. In this example, the user may configure his/her information screen to monitor various data from his/her network of devices. For example, at a glance, the user may monitor a webcam and other data from his/her summer house such as inside/outside temperature, alarm status, furnace status, etc. The additional information may be variously configured to only appear once the picture is clicked on by the user, where the user hovers over the picture with the mouse, and/or overlaid over the location information supplied by the webcam. Similarly, the view from the user's dock may be displayed with tide, wind speed and direction, as well as outside temperature. Further thumbnails may be displayed including such webcams as the local airports (e.g., LaGuardia and Newark), traffic cams from the drive home, the user's living room, baby's room, and/or day care center, the alarm status of the home including a map of the various rooms and associated alarm status and diagnostics.

Still referring to FIG. 12, the system may further be configured to download and/or upload information from various devices and include virtual images of the controls of those devices on a connected web page. For example, a user wishing to set his alarm clock to get up early for an important meeting may do so from work. By accessing the web page (e.g., www.mydatadirect.com) the user may be presented with a virtual image of the alarm clock sitting next to his/her bed. The user may click on various buttons and set the alarm for every day, and/or for only a certain day. The control command is then sent to the device using a suitable protocol, e.g., IP. The alarm clock may then respond with a message (e.g., via e-mail, SMS, chat, or to the web page www.mydatadirect.com) confirming that it has received the new settings and will adjust its settings accordingly. The alarm clock may be further programmed to notify other users (e.g., the husband and wife) where the alarm clock serves the needs of more than one person. In this manner, the spouse is notified when the alarm clock is changed. For example, the alarm clock may have multiple alarms one controlled by each spouse. Alarms may also be password protected, for example, so that one spouse cannot change the settings of the other spouse without having the password. In other examples, the alarms of children cannot be turned off and/or altered without the password.

Referring now to FIG. 13, another example of home appliance control is shown in accordance with aspects of the disclosure. In this example, a receiver 300 may be integrated into and may control, via a separate wireless module 1304, a lawn sprinkler 1300 so that the sprinklers 1300 is turned on and off in accordance to the commands of the server 101 (via the gateway 141 or other terminal). Thus, as discussed above, a user may be able to remotely operate the sprinkler 1300 by logging into the server 101, and the server 101 may be configured to automatically operate the sprinkler 1300 in response to certain conditions (e.g., sensor readings, news alerts). The separate wireless module 1304 may include a battery operated valve that would control when the sprinkler 1300 is allowed to operate. In this example, a home owner may be able to control their lawn sprinkler 1300 remotely via the web site of the server 101. For instance, a user away from home on a vacation may log into the server 101 to turn off the sprinkler 1300 if the user discovers that it has recently rained at the user's house. As another example, the server 101 may be configured, using a similar technique to the notification process, to turn off the sprinkler 1300 automatically (i.e., without explicit user instructions) when an external rain sensor 200 at the user's house indicates that it has recently rained a sufficient amount to water the lawn. In a similar example, rather than turning the sprinkler 1300 off entirely, the server 101 may be configured to increase or decrease the watering time for the sprinkler 1300 based on the recent precipitation measures at a sensor 200 or received from a weather source via the server 101.

As an alternative to a separate rain sensor 200, the sprinkler 1300 may include its own rain gauge and be configured to be powered via a turbine and energy store included within the sprinkler module 1304 so that the power would be generated based on the water flow through the turbine. This power would then be stored in a capacitor and used to open or close a valve to either turn off or turn on the water flow. The water flow would be turned off or turn on based on information about the weather received by the server 101. For example, if it was determined that there was a high probability of rain within the next eight hours, the sprinkler 1300 would not be turned on at that time.

As another example, a power consumption sensor 200 may be installed between an appliance and the wall socket. This will enable a user to monitor and view the energy requirements for all electrical appliances in his/her home. This data can be uploaded to the user's information website (e.g., www.WeatherDirect.com) to track, monitor, or adjust the settings of the respective appliances.

Referring now to FIG. 14, an example of a smoke detector detector device 1400 is shown. As discussed above in reference to FIG. 5, smoke detector detector 1400 may be configurable to provide an alarm indication based on a detection of an audible alarm at a remote location. The device 1400 in this example may be configured to respond to smoke detectors, fire alarms, burglar alarms, and/or may be programmable/configurable so that it can respond to custom alarm sounds or other noises occurring at the remote location.

In yet another example, based on the weather forecast received at the server 101, a heater may be turned on when there is a high probability that the low temperature would exceed a user's particular threshold so that the heater is efficiently controlled. For example, when it is warmer outside in the situation of a heat pump, so that the house could be warmed up prior to the temperature dropping. By integrating weather prediction capabilities into a furnace's control system, it may be possible to increase the SEER rating of the furnace beyond the levels achieved today.

Referring now to FIG. 15, another example implementation is shown for a remote location monitoring system. In this example, two locations 400*a* and 400*b* are shown, each location including a gateway device 141*a* and 141*b*, respectively. As discussed above, locations 400*a* and 400*b* may include residences, businesses, or other enterprises. The remote location monitoring system shown in FIG. 15 also includes several sensor devices 200, which may correspond to any of the various types and capabilities of sensor devices described above. Gateway devices 141*a* and 141*b* may be configured to receive sensor data from sensor devices 200, and transmit the sensor data to a remote location monitoring server 101.

Various receiver devices 300 are also shown in the remote location monitoring system shown in FIG. 15. Receiver devices 300 may include specialized hardware devices 300, such as those described above, having specialized hardware and/or software components for weather monitoring, remote location monitoring, and the like. Additional receiver devices 300 may include general purpose computing devices (e.g., desktop computers, laptop computers, tablet computers, and smartphones and other mobile devices) configured with web browser or other application software (e.g., a mobile application executing on a smartphone or other mobile device) to support the various weather monitoring and remote location monitoring functionality described herein. To support such functionality, receiver devices 300 (both general purpose and specialized devices) may be configured with network interfaces to communicate with the remote location monitoring server 101, and with input/output capabilities and a user interface to provide remote location monitoring functionality to the users of the receiver device 300. As shown in FIG. 15, receiver devices may include networking hardware and software components for direct communication with the remote location monitoring server 101 (e.g., via a LAN, Internet, or other communication network) or communication with the remote location monitoring server 101 via a gateway device 141.

As shown in FIG. 15, sensor devices 200 may include various indoor and/or outdoor sensors. For example, indoor sensor devices 200 installed or positioned within homes or businesses 400 may include temperature sensors, humidity sensors, light sensors, smoke sensors, noise sensors, motion sensors, fire sensors, standing water sensors, power consumption sensors, carbon monoxide sensors, etc. Outdoor sensor devices 200 may be installed or positioned outside of homes or businesses 400, such as in yards, trees, gardens, garages, vehicles, window wells, greenhouses, or doghouse, or may be mounted to external surfaces of the home or business 400 such as the roof or a window. A single home or business 400 may have multiple indoor sensors 200 and/or outdoor sensors 200 positioned in and around the home or business 400, each of which may be configured to communicate with gateway devices 141.

The communication between sensors 200 and gateway devices 141 may be two-way or one-way communication. For example, in some implementations, sensors 200 may be configured to periodically or continuously transmit its sensor data via one-way communication to any gateway device 141 in range. As shown in FIG. 15, a single sensor device 200*a* within range of both gateways 141*a* and 141*b* may transmit its data to both gateways, each of which may then transmit the sensor data of sensor 200*a* to the server 101. Additionally, in some configurations a single location 400, such as a large house or large business, may be multiple gateways 141 to support the larger necessary coverage area, larger number of sensors 200, or for purposes of backup in case one of the gateway devices 141 fails. Thus, whenever multiple locations 400 having gateways 141 are sufficiently close together (e.g., nearby houses, condos, businesses, etc.), or whenever a single location 400 has multiple gateways 141, then data from any sensor 200 may potentially be received, stored, and transmitted to the server 101 by multiple gateways 141.

Accordingly, the sensor data transmitted from the sensor devices 200 to the gateway devices 141, and then from gateways devices 141 to the server 101, need not identify or be dependent on any specific gateway device 141. For example, when a sensor device 200 transmits its sensor data, it may transmit a data structure or data package including a unique sensor identifier, a sequence number, and the sensor data itself. The sensor identifier may be unique to the specific sensor device 200, and may correspond to a serial number (e.g., a 16-digit number) of the sensor device 200 or any other unique identifier. A transmission sequence number (e.g., a 3-, 4-, or 5-digit number) may be incremented by the sensor device each data a new set of sensor data is transmitted. As an example, a first transmission of sensor data after a sensor device 200 is first turned-on may include the sensor device's 200 unique 16-digit sensor identifier, followed the 3-digit sequence number "000" indicating that this is the first transmission from the sensor 200 (or the 1,000$^{th}$ transmission, the 2000$^{th}$ transmission, etc.), followed by the sensor data itself, which may be of various different sizes and formats depending on the type of the sensor 200 and the types and amounts of data it collects.

Continuing the above example, the gateway device 141 may then receive and temporarily store the data from the sensors 200, before transmitting the data to the remote location monitoring server 101. In some embodiments, the gateway device 141 need not add any additional data or modify the data received from the sensors 200, except for potentially adding network protocols headers and the like for transmission to the server 101. For instance, the gateway device 141 need not add a gateway identifier or any equivalent information before transmitting the sensor data to the server 101. As discussed above, identical sets of data from a single sensor 220*a* (e.g., a data package comprising a sensor identifier, a sequence number, and the sensor data itself) may be received by and transmitted from multiple different gateway devices 141*a* and 141*b*. After the server 101 receives and stores sensor data from various different gateways 141, and the server 101 may use the sensor identifiers and sequence numbers from the sensor data to identify and/or remove duplicate sets of sensor data. In such cases, the server 101 need not store or track any gateway identifier information, because it is irrelevant to the server 101 which gateway 141 (or gateways 141) transmitted the sensor data.

As illustrated above, such examples may provide advantages in both convenience and reliability for remote location monitoring systems, weather monitoring systems, and the like. For instance, if a gateway 141*a* is not functioning due to a hardware malfunction or power outage, or if the gateway 141*a* in unable to connect to the server 101 due to a router malfunction or other loss of connectivity, then another nearby gateway 141*b* may effectively function as a backup gateway by receiving sensor data from all sensors 200 within range (including those nearer to gateway 141*a*) and transmitting the sensor data to the server 101. Such configurations also may allow for an easier and more convenient setup process. For instance, rather than defining and enforcing relationships between individual sensor devices 200 and gateways 141, each sensor device 200 may be configured to transmit its sensor data to all available gateway devices 141 and each gateway device 141 may be configured to receive, store, and transmit sensor data from any sensor device 200 to the server 101. Thus, in such embodiments, users need not configure each of their individual sensor devices 200 to communicate exclusively with their gateway device 141, or vice versa.

Thus, in some implementations, sensor devices 200 and gateway device 141 may be designed for universal and non-exclusive communication with each another, so that any sensor device 200 may transmit its sensor data to any gateway 141 seamlessly and without any dedicated setup process linking the devices. However, in other implementations, sensor devices 200 may be configured to communicate only with one or more specific gateway devices 141. For instance, certain types of data from some sensors 200 may be considered private or confidential data, and for security purposes this data may be transmitted only to one or more designated gateway devices 141, rather than being broadcasted to any gateway device 141 within the transmission range of the sensor 200. Thus, users may protect security-related sensor data from a home or business 400*a*, or other personal or confidential sensor data, by requiring that such data by transmitted only to their gateway 141*a* and not to gateways 141*b* in other locations or under the control of other users or businesses. In such examples, two-way communication may be used so that the sensor device 200 may confirm the identity of the recipient gateway 141 before transmitting its sensor data. In some cases, additional security techniques may be used including authentication, secure network protocols, and/or encryption to protect the transmission of sensor data between the sensor device 200 and gateway 141.

Referring now to FIG. 16, an example method is shown in which a gateway device and sensor devices are installed and setup to commence communication with a remote location monitoring server 101.

In step 1601, a gateway device (e.g., 141) is installed at a location 400 (e.g., a home, business, or other location) and connected to an operating router at the location. The gateway 141 may use a network cable or establish a wireless connection with the router. In other examples, the gateway 141 need not connect to a router at the location 400, but instead may communicate directly to the server 101 using a cellular network, hot spot, or another local area network (LAN) or wide area network (WAN) such as metropolitan area networks (MAN) or wireless networks associated with educational institutions or other organizations.

In step 1602, the gateway device 141 may establish contact with a remote location monitoring server 101. In some cases, the gateway device 141 may be preconfigured with one or more network identifiers, so that the user (e.g., home owner, business owner, etc.) need not input a network location in order for the gateway device 141 to establish communication with the server 101. In such cases, the use might only be required to plug-in the gateway device 141, and connect it a router or other network interface, after which the gateway device 141 may automatically establish communication with the server 101. In other cases, the user may input a server name or identifier (e.g., URL, IP address, etc.) use a personal computer or mobile device to input the server name (e.g., URL, IP address, etc.) to allow the gateway device 141 to establish communication with the server 101.

After successfully establishing communication the remote location monitoring server 101, the gateway device 141 may turn on an indicator light to inform the user that communication with the server has been established and the gateway is now ready to receive and upload sensor data. In some cases, the gateway 141 may periodically attempt to re-establish communication with the server 101. Such communication attempts by the gateway 141 may occur while transmitting sensor data to the server 101, or periodically even when the gateway 141 is not transmitting sensor data, in order to confirm that the communication link with the server 101 remains intact. A failed attempt to re-establish communication with the server may indicate a malfunction of the gateway device 141, maintenance at the server 141, or a router or network outage, etc. In this case, the gateway device 141 may inform the user it is no longer in communication with the server 101 using an audible indication or indictor light on the gateway device 141, or by transmitting a notification to the user's receiver device 300 (e.g., smart phone, personal computer, or remote location monitor receiver, etc.).

In step 1603, one or more sensor devices 200 is installed and activated at the location 400. Sensor devices may be battery-powered and/or may be plugged into a power source at the location 400 (e.g., an AC power wall outlet). In some cases, installation and activation of a sensor device 200 may involve nothing more than plugging-in or inserting batteries into the device 200. For example, as discussed above, certain sensors 200 and gateways 141 may be configured for one-way communication between the sensor and gateway, and some sensors 200 may broadcast their sensor data to any gateway devices 141 in range. In such examples, the user need not perform any additional action to configure the sensor device 200 or gateway 141 to identify the corresponding device and establish the communicate link. Instead, both the sensor devices 200 and gateways 141 may be preconfigured to communicate via the same one or more RF frequencies, and to use the communication protocols for transmitting/receiving the sensor data. Thus, such systems may be automatically operational without any additional user action other than powering the devices 141 and 22 and/or connecting the gateway 141 to a router for network access. Further, any sensor device 200 or gateway 141 within such a system may be seamlessly replaced during the lifetime of the system, without the need to update or reconfigure the remaining devices 200 in the system.

In step 1604, after the installation and activation of the sensor devices 200, the sensors 200 may begin to transmit sensor data to the gateway device 141. As discussed above, sensor devices 200 may include various indoor and/or outdoor sensors, including any of the sensor types and capabilities discussed above. As noted above, in some cases the transmission of data from a sensor device 200 may commence automatically after the sensor device 200 is provided power. For instance, one-way communication sensor devices 200 may be preconfigured to automatically collect and transmit sensor data without requiring any setup or configuration process to be performed by the user. Thus, the pre-configurations to sensor devices 200 may include the type of data to be collected, the time intervals for collecting sensor data, the time intervals for transmitting the sensor data, the transmission power and frequency, and the communication protocols used for transmitting the sensor data. Thus, such preconfigured sensor devices 200 may begin transmitting their sensor data even if there is no gateway device 141 in range and no other device receiving the sensor data transmissions.

In other examples, one or more of the sensor configurations described above (e.g., data types to collect, collection intervals, transmission intervals, transmission power, transmission frequency, communication protocols, etc.) may be configurable by users. For example, two-way communication may be enabled between a sensor device 200 and gateway 141, and a user interface may be provided to allow the user to reconfigure the sensor devices 200 via the gateway 141. For instance, a sensor device configuration web page or a remote location monitoring mobile application may allow the user to configure any of the above functions of the sensor device 200. These configuration parameters may be input by the user via a receiver device 300, and may be transmitted to the sensor 200 via the gateway 141. Such sensor configuration may also define the set of gateway devices 101 and security protocols that a sensor may use for transmitting some or all of its collected sensor data. For instance, a user may log-in to a sensor management web page, or may access a sensor configuration user interface via a remote location monitoring mobile application on their smartphone 300, in order to change the type of data collected by a sensor 200, the frequency or precision of the sensor readings, the sensor data transmission intervals, the transmission power (e.g., for when the sensor is moved further away or closer to the gateway 141), the communication protocols (e.g., secure or unsecure), and/or encryption required (if any) used for transmitting the sensor data.

In step 1605, the gateway device 141 receives and stores sensor data from one or more sensors 200. As discussed above, the communication from the sensor 200 to the gateway 141 may be one-way communication only in some embodiments. In such cases, the gateway device 141 might not have any control over the sensor device 200, or any capability to confirm receipt of data or request retransmission of sensor data. A gateway device **141*a* also might not be aware of any other gateway devices that are also receiving the same data from the same sensor device 200*a***.

In step 1606, the gateway device 141 may transmit the received sensor data to the remote location monitoring server 101. In some embodiments, the gateway device 141 may be configured to transmit the received sensor data to the server 101 immediately after receiving and processing the data from the sensor device(s) 200. For instance, one or more sensor devices 200 may be preconfigured to transmit data on a synchronized schedule every 30 seconds, minute, every 5 minutes, every 15 minutes, etc. In such cases, the gateway device 141 may receive a block of data from one or more sensors at or near these intervals, and may immediately forward the data to the server 101. In other examples, data may arrive at the gateway 141 continuously or at various different time intervals from different sensors 200. In these cases, the gateway 141 may receive and store data in the gateway memory for a period of time, and then transmit a block of data to the server 101 at predetermined intervals (e.g., every 30 seconds, every minute, every 5 minutes, etc.).

If a gateway device 141 cannot transmit its data to the server 101, for example, due to server maintenance or a network outage, the device may continue to receive and store sensor data until the connection to the server 101 is restored. Certain embodiments of gateway devices 141 may include flash memory capable of storing, for example, up to 10,000 sets of sensor data. Incoming sensor data may continue to accumulate in the memory of a gateway device 141 until the server 101 is once again accessible, after which the accumulated data may be transmitted and the gateway memory may be cleared (e.g., deallocated).

Referring now to FIG. 17, an example method is shown in which a receiver device 300 may use a mobile application to receive, analyze, and display data from selected sensors.

In step 1701, a mobile receiver device 300 may download and install a mobile application for remote location monitoring. The mobile receiver device 300 may be general purpose computing device (e.g., a smartphone or tablet computer) or a specialized receiver device such as those described above, having specialized hardware and/or software components for weather monitoring, remote location monitoring, etc. A user of a mobile receiver 300 may download and install a remote location monitoring mobile application, for example, by accessing a website or a mobile application store. In various embodiments, different versions of mobile applications for remote location monitoring may be developed for different mobile receiver devices 300 to leverage the different operating systems, different input/output capabilities, etc., of the different receiver devices 300.

As discussed below, the mobile application installed in step 1701 may be used to remotely monitor a set of sensors 200 at a mobile receiver device 300. The mobile application may allow users to add or remove sensors 200 from an active list of sensors to be monitored, and then receive and display sensor data from the sensors in the active list. The mobile application may also allow users to setup notifications and alerts that are triggered based on predetermined sensor conditions, and implement the notifications and alerts by continuously monitoring all newly received sensor data. FIGS. 18A-18D, discussed below, are screenshots illustrating various functions of an example mobile application.

In step 1702, one or more sensor device identifiers (e.g., serial numbers or other identifiers) may be received by the mobile application. In some cases, a user of the mobile receiver device 300 may input the sensor device identifiers, either manually or by using a camera, scanner, or barcode reader of the receiver device 300. The sensor device identifiers that are input into the mobile application step 1702 may correspond to the sensors that the user wishes to monitor via the mobile application. For example, a user that wants to monitor a set of sensors 200 in and around his home or business location 400 may begin by locating each sensor's serial number or other unique identifier. A sensor's serial number or identifier may be printed on the sensor's packaging and/or on the sensor itself. The sensor's serial number or identifier may be unique insofar as no two sensors may be assigned the same serial number or identifier, thereby allowing users to input the serial number or identifier in order to unambiguously monitor a specific sensor device 200.

Referring now to 18A, an example screen 1810 of a remote location monitoring mobile application user interface 1810 is displayed on a receiver device 300 (e.g., a smartphone or other mobile device). In this example, the mobile application is controlling the internal camera of the receiver 300 to allow the user automatically add a sensor device 1400 by taking a picture of the sensor's serial number 1410. The sensor device 1400 in this example may be a smoke detector detector device, described above in FIG. 14, but the same technique may be used for photographing the serial number or other identifier of any sensor device 200. After the user locates the sensor's serial number 1410 and focuses the camera on it, button 1811 may be selected to capture the image and automatically add the sensor to the list of sensors currently being monitored for the user via the mobile application. After the user selects button 1811 to capture the image of the sensor's serial number 1410, the mobile application may execute image analysis software (e.g., text recognition) to resolve the serial number 1410 from the image. Alternatively, the user may select button 1812 to manually type in the sensor's serial number. This option may also be used if the attempt to resolve a serial number 1410 from a captured image fails or is inconclusive. Additionally, although a 16-digit numeric serial number 1410 is used in this example, a sensor serial number 1410 may be any combination of alphanumeric characters. Furthermore, other embodiments need not use serial numbers but instead may use sensors having unique barcodes (e.g., UPC numbers and barcodes), unique Quick Response (QR) codes, or any other unique code or identifier that may be captured using a camera, scanner, or barcode reader of the receiver device 300.

In step 1703, the mobile application may retrieve sensor data from the remote location monitoring server 101 for each of the sensor devices 200 currently being monitored by the mobile application, and in step 1704 the retrieved sensor data may be displayed on the receiver device 300. The list of currently monitored sensor devices 200 may include any sensors whose serial numbers were input by the user in step 1702 (e.g., via camera, scanner, barcode reader, or by manual input). There is no limit to the number of sensor devices 200 being monitored by a receiver device 300. Additionally, multiple receiver devices 300 may monitor the same sensors 200 at the same time, even when the multiple devices 300 are in different locations, owned/controlled by different users, etc. In some cases, the mobile application executing on the user's receiver device 300 may periodically establish communication with the server 101 to retrieve the most recent sensor data for each of the list of currently monitored sensors 200. Updated sensor data may be retrieved from the server 101 according to a predetermined schedule (e.g., every 5 minutes, every 15 minutes, every hour, etc.) or may be retrieved from the server 101 based on a user action at the receiver device 300, such as activating the mobile application or requested updated sensor data. In other cases, the mobile application may initially contact the server 101 to subscribe to sensor data updates for its list of sensor devices 200, after which the server 101 may monitor the sensor data and automatically transmit any updated data to the subscribing mobile application on the receiver 300.

In some examples, a uniform data set may be transmitted from the remote location monitoring server 101 to the receiver 300 corresponding to the most recent sensor data collected by the set of sensor devices 200 being monitored by the receiver 300. However, in other examples, the mobile application executing on the receiver may provide the user the capability of customizing the data retrieved and manner of retrieval from the server 101. For instance, a user may use the mobile application to request automatic sensor data updates from only a subset of its associated sensors 200. Additionally, the user may configure the mobile application to retrieve only a subset of the data collected by a sensor device 200. For instance, a weather sensor may collect temperature data, humidity data, air pressure data, wind speed and direction data, etc., but the user might only be interested in receiving the temperature data. Thus, in step 1703 the mobile application on the receiver device 300 and the server 101 may coordinate so that only the desired data from the desired sensors 200 is transmitted to the receiver 300. Additionally, in some cases the user may interact with the mobile application to configure the time intervals at which sensor data for various sensors is retrieved from the server 101. In some embodiments, the mobile application may allow users to enter one or more email addresses in order to receive periodic emails containing the sensor data (e.g., XML files contain current and historical sensor data for all monitored sensors.

Figure 18A:
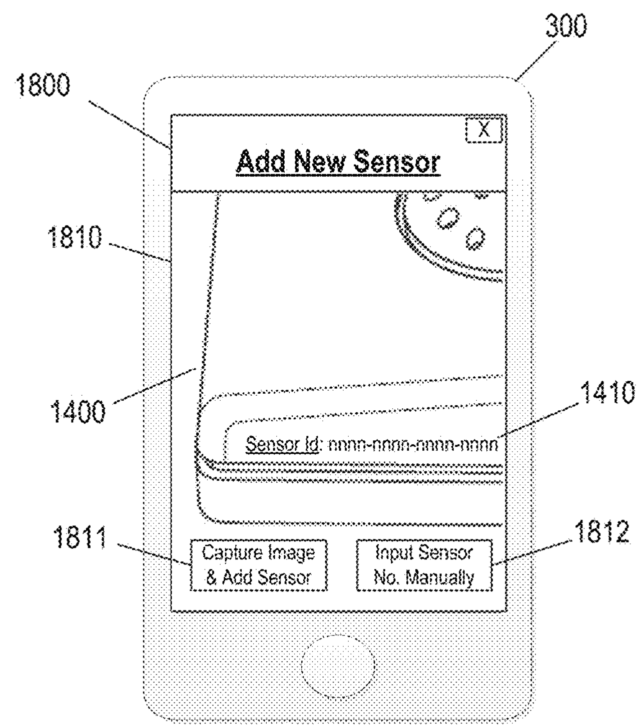
Figure 18B:
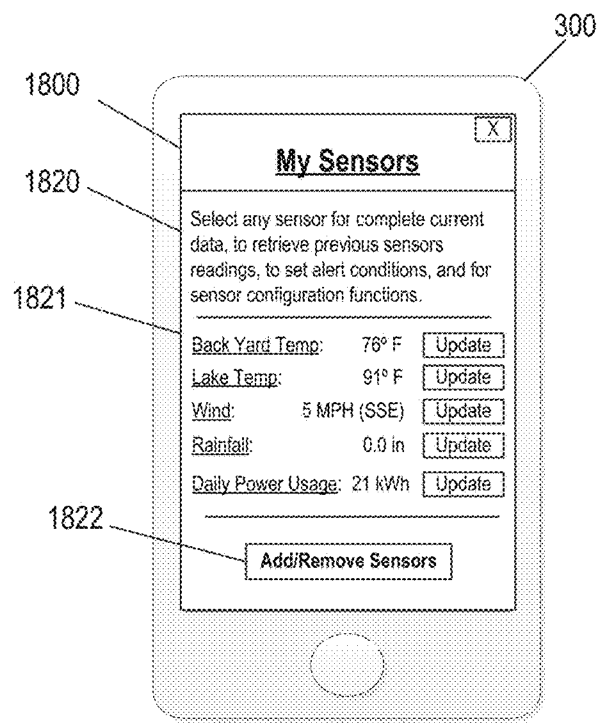

Referring now to FIG. 18B, another example screen 1820 of a user interface 1800 of a remote location monitoring mobile application is displayed on the receiver device 300. In this example, after the user of the receiver 300 has initiated the mobile application, a "My Sensor" screen 1820 is presented to show the user the latest sensor data collected by each sensor device 200 that the user is tracking via the mobile application. The user in this example is tracking five different sensors, and the updated sensor data for each sensor is shown in region 1821. As shown in this example, the mobile application may allow the user to assign a familiar name to each sensor device 200, so that the sensor data is displayed in region 1821 in an easy to read manner. In some cases, the user may also configure which data and data format is used for displaying the sensor data via the mobile application, for example, by selecting the sensor name to configure these properties and others (e.g., the type(s) of data displayed, the units of measurement displayed, the time interval for requesting or retrieving updated sensor data from the server 101, etc.). In this example, the user may select button 1822 to add new sensor devices 200 to the list 1821 of sensors being monitored, or to remove sensor devices 200 from the list 1821.

In addition to allowing the user to define and monitor a set of sensors 200, in some embodiments, the remote location monitoring mobile application may also allow users to define and receive notifications or alerts in response to predefined sensor conditions. For example, as illustrated above in FIGS. 18A and 18B, users may identify one or more sensor devices 200 and then use a mobile application for remote location monitoring to retrieve and view sensor data from the selected sensors 200 on their mobile device 300. However, in some cases, updated sensor data might not be retrieved or displayed to the user until the user expressly requests the data, for example, by opening the mobile application via the mobile device 300. Therefore, it may be advantageous to allow users to define alerts and other notifications to be received automatically in the event that certain readings detected at sensor devices 200. Such notifications may be setup via the mobile application or other interfaces (e.g., a remote location monitoring web-page, etc.), and the notifications may include alerts presented via the mobile application or via other techniques, such as short message service (SMS) messages, automated voice calls, and email notifications.

Figure 18C:
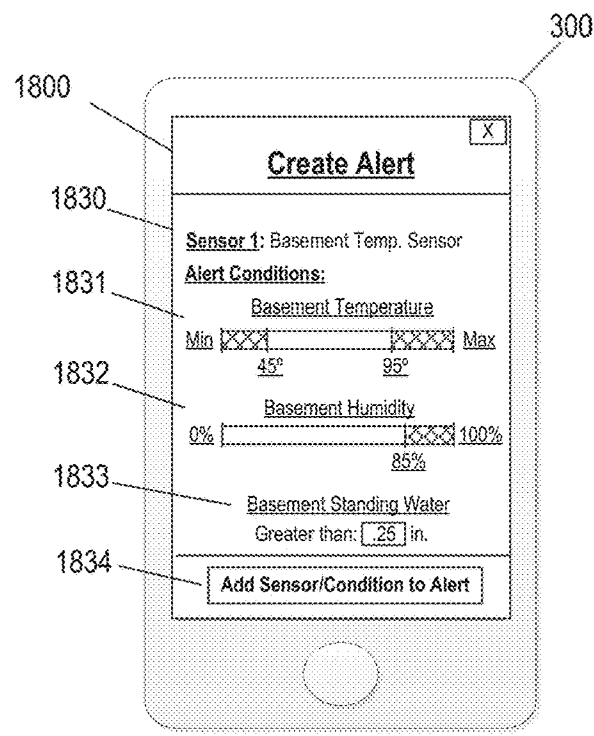

Referring now to FIG. 18C, another example screen 1830 of a user interface 1800 of a remote location monitoring mobile application is displayed on the receiver device 300. In this example, screen 1830 is presented to allow the user to define the triggering conditions for a remote location monitoring alert. Alerts and other notifications may be triggered based on a single triggering condition of a sensor device 200 (e.g., trigger an alert in response to a smoke detector detection reading), multiple triggering conditions from a sensor device 200 (e.g., trigger an alert in response to a wind sensor reading and a rain or snow sensor reading), or a combination of one or more triggering conditions from multiple different sensor devices 200 (e.g., trigger an alert in response to an appliance power sensor reading and a temperature sensor reading). In the example shown in FIG. 18C, the user is creating an alert based on a combination of readings from a single sensor, a basement environmental condition sensor 200. Specifically, the user has used the interface screen 1830 to define high and low temperature ranges 1831, a high humidity range 1832, and a standing water threshold 1833. In this example, the combination of all three conditions (i.e., a reading in one of the designated temperature ranges, a reading in the humidity range, and a reading above the standing water threshold) may trigger an alert to the mobile device 300. In other examples, the user may define that any one of the conditions, or any two of the conditions, is sufficient to trigger an alert. Additionally, the user may select button 1834 to add one or more additional triggering conditions to this alert, either from the same sensor device 200 or another sensor device 200.

Figure 18D:
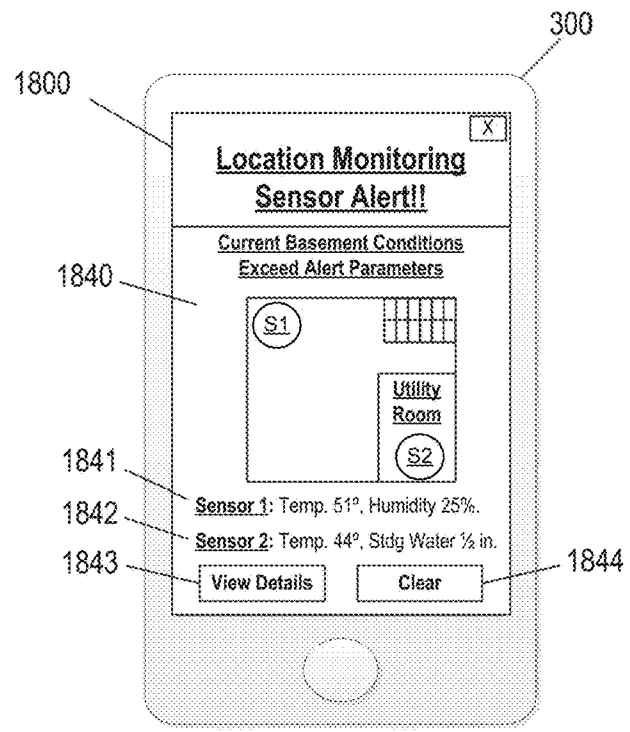

Referring now to FIG. 18D, another example screen 1840 of a user interface 1800 of a remote location monitoring mobile application is displayed on the receiver device 300. In this example, the alert screen 1840 may be triggered by the detection of sensor conditions within one or more predetermined range(s) previously setup by the user. In this example, the alert relates to the environmental conditions in the user's basement, including the temperature, humidity, and presence of standing water at two different basement sensors. The alert user interface 1840 in this example includes a layout of the user's basement, along with the data readings collected by the user's two basement sensors 1841 and 1842. In some cases, although only one sensor may trigger an alert (e.g., sensor reading 1842), the alert user interface may include additional data from nearby sensors (e.g., sensor reading 1841) for comparison purposes and to determine if a sensor malfunction has caused the alert. Finally, in this example, the user may select button 1843 to view additional details related the alert (e.g., additional sensor data readings, previous readings from the same sensors, data from other nearby sensors, etc.) or to request updated sensor data from the server 101. The user may also dismiss the alert with button 1844, which may cause the alert to be logged, leave the notification active, but dismiss the user interface screen 1840.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. An apparatus comprising:

one or more processors;

a display; and memory storing computer executable instructions that, when executed by the one or more processors, cause the apparatus to:

receive, via a user interface output by the display, identification data associated with one or more sensors;

receive, via the user interface, data retrieval settings for the one or more sensors;

receive, via the user interface, notification settings for the one or more sensors;

retrieve, from a server and based on the data retrieval settings, sensor data for the one or more sensors; and output, to the display and based on the notification settings and the sensor data, one or more notifications.

2. The apparatus of claim 1, wherein the identification data comprises, for a first sensor of the one or more sensors, a serial number.

3. The apparatus of claim 1, wherein the identification data comprises, for a first sensor of the one or more sensors, a Quick Response (QR) code, and wherein the QR code is received via an imaging device of the apparatus.

4. The apparatus of claim 1, wherein the memory stores instructions that, when executed by the one or more processors, cause the apparatus to periodically receive, from the server, updated sensor data for the one or more sensors.

5. The apparatus of claim 1, wherein the data retrieval settings comprise a request to retrieve, for a first sensor of the one or more sensors, a subset of data collected by the first sensor.

6. The apparatus of claim 1, wherein the data retrieval settings comprise a time interval at which sensor data for a first sensor of the one or more sensors is to be retrieved.

7. The apparatus of claim 1, wherein the memory stores instructions that, when executed by the one or more processors, cause the apparatus to:

output, to the display, the sensor data retrieved from the server.

8. The apparatus of claim 7, wherein the memory stores instructions that, when executed by the one or more processors, cause the apparatus to:

format the sensor data of a first sensor, of the one or more sensors, based on user configuration information associated with the first sensor.

9. The apparatus of claim 1, wherein the one or more sensors are selected by a user via the user interface.

10. The apparatus of claim 1, wherein the sensor data is received via a wireless network.

11. A method, comprising:

receiving, via a user interface output to a display screen of a mobile device, identification data associated with one or more sensors;

receiving, via the user interface, data retrieval settings for the one or more sensors;

receiving, via the user interface, notification settings for the one or more sensors;

retrieving, from a server and based on the data retrieval settings, sensor data for the one or more sensors; and outputting, to the display screen of the mobile device and based on the notification settings and the sensor data, one or more notifications.

12. The method of claim 11, wherein the identification data comprises, for a first sensor of the one or more sensors, a Quick Response (QR) code received via an imaging device of the mobile device, or a serial number.

13. The method of claim 11, further comprising periodically receiving, from the server, updated sensor data for the one or more sensors.

14. The method of claim 11 further comprising:

outputting to the display screen of the mobile device, the sensor data retrieved from the server.

15. The method of claim 14, further comprising formatting the sensor data of a first sensor, of the one or more sensors, based on user configuration information associated with the first sensor.

16. A system, comprising:

one or more sensors; and a mobile device comprising:

a display;

one or more processors; and memory storing computer executable instructions that, when executed by the processor, cause the mobile device to:

receive, via a user interface output by the display, identification data associated with one or more sensors;

receive, via the user interface, data retrieval settings for the one or more sensors;

receive, via the user interface, notification settings for the one or more sensors;

retrieve, from a server and based on the data retrieval settings, sensor data for the one or more sensors; and output, to the display and based on the notification settings and the sensor data, one or more notifications.

17. The system of claim 16, wherein the identification data comprises, for a first sensor of the one or more sensors, a Quick Response (QR) code received via an imaging device of the mobile device or a serial number.

18. The system of claim 16, wherein the data retrieval settings comprise a request to retrieve, for a first sensor of the one or more sensors, a subset of the data collected by the first sensor.

19. The system of claim 16, wherein the data retrieval settings comprise a time interval at which sensor data for a first sensor of the one or more sensors is to be retrieved.

20. The system of claim 16, wherein the memory stores computer executable instructions that, when executed by the one or more processors, cause the mobile device to periodically receive, from the server, updated sensor data for the one or more sensors.

* * * * *